US012683155B2

(12) United States Patent
Ma et al.

(10) Patent No.: US 12,683,155 B2
(45) Date of Patent: Jul. 14, 2026

(54) CATHODE ACTIVE MATERIAL, METHOD OF PREPARING THE SAME, AND CATHODE AND SECONDARY BATTERY INCLUDING THE SAME

(71) Applicants: Samsung Electronics Co., Ltd., Suwon-si (KR); THE ROYAL INSTITUTION FOR THE ADVANCEMENT OF LEARNING/MCGILL UNIVERSITY, Montreal (CA)

(72) Inventors: Sangbok Ma, Suwon-si (KR); Shipeng Jia, Hebei (CN); Antranik Jonderian, Damascus (SY); Eric Mccalla, Quebec (CA)

(73) Assignees: SAMSUNG ELECTRONICS CO., LTD., Gyeonggi-Do (KR); THE ROYAL INSTITUTION FOR THE ADVANCEMENT OF LEARNING/MCGILL UNIVERSITY, Quebec (CA)

( * ) Notice: Subject to any disclaimer, the term of this patent is extended or adjusted under 35 U.S.C. 154(b) by 689 days.

(21) Appl. No.: 18/089,949

(22) Filed: Dec. 28, 2022

(65) Prior Publication Data

US 2023/0343955 A1 Oct. 26, 2023

(30) Foreign Application Priority Data

Apr. 26, 2022 (KR) ........................ 10-2022-0051693

(51) Int. Cl.
| | |
|---|---|
| *H01M 4/525* | (2010.01) |
| *H01M 4/02* | (2006.01) |
| *H01M 4/38* | (2006.01) |

(52) U.S. Cl.
CPC ........... *H01M 4/525* (2013.01); *H01M 4/382* (2013.01); *H01M 2004/028* (2013.01)

(58) Field of Classification Search
CPC ........................... H01M 4/525; H01M 4/5825
See application file for complete search history.

(56) References Cited

U.S. PATENT DOCUMENTS

| | | | |
|---|---|---|---|
| 10,050,271 | B2 | 8/2018 | Barker et al. |
| 10,147,933 | B2 | 12/2018 | Soma et al. |

(Continued)

FOREIGN PATENT DOCUMENTS

| | | | | |
|---|---|---|---|---|
| CN | 102456881 | A | * | 5/2012 |
| CN | 102842714 | A | * | 12/2012 |

(Continued)

OTHER PUBLICATIONS

CN102456881A translation (Year: 2012).*

(Continued)

*Primary Examiner* — Allison Bourke
*Assistant Examiner* — Travis L. Martin
(74) *Attorney, Agent, or Firm* — CANTOR COLBURN LLP

(57) ABSTRACT

A cathode active material including a compound represented by Formula 1 and having an olivine structure:

$$Li_{1-\alpha}CO_{1-x-y}In_xM_yPO_4 \hspace{2cm} \text{Formula 1}$$

wherein in Formula 1, $0 \leq \alpha < 1$, $0.01 \leq x \leq 0.1$, and $0.01 \leq y \leq 0.1$, and M in Formula 1 is a divalent element, a trivalent element other than In, a tetravalent element, a pentavalent element, or a combination thereof.

17 Claims, 11 Drawing Sheets

(56)                    References Cited

U.S. PATENT DOCUMENTS

| 10,170,212 B2 | 1/2019 | Barker et al. |
| 10,243,200 B2 | 3/2019 | Soma et al. |
| 2012/0273716 A1 | 11/2012 | Li et al. |
| 2020/0014011 A1 | 1/2020 | Wollfarth et al. |

FOREIGN PATENT DOCUMENTS

| CN | 109148881 A | | 1/2019 |
| CN | 109659560 B | | 7/2020 |
| JP | 2010067374 A | * | 3/2010 |
| JP | 2015146307 A | * | 8/2015 |
| JP | 6356425 B2 | | 6/2018 |

OTHER PUBLICATIONS

CN102842714A translation (Year: 2012).*
JP2010067374A translation (Year: 2010).*
JP2015146307A translation (Year: 2015).*

* cited by examiner

INTENSITY
(Arbitrary
Units, A.U.)

PREPARATION EXAMPLE7

PREPARATION EXAMPLE6

PREPARATION EXAMPLE5

PREPARATION EXAMPLE4

PREPARATION EXAMPLE3

PREPARATION EXAMPLE2

PREPARATION EXAMPLE1

COMPARATIVE
PREPARATION EXAMPLE4

COMPARATIVE
PREPARATION EXAMPLE3

COMPARATIVE
PREPARATION EXAMPLE2

COMPARATIVE
PREPARATION EXAMPLE1

Diffraction Angle (Degrees 2 theta)

CATHODE ACTIVE MATERIAL, METHOD OF PREPARING THE SAME, AND CATHODE AND SECONDARY BATTERY INCLUDING THE SAME

CROSS-REFERENCE TO RELATED APPLICATION

This application is based on and claims priority to Korean Patent Application No. 10-2022-0051693, filed on Apr. 26, 2022, in the Korean Intellectual Property Office, and all the benefits accruing therefrom under 35 U.S.C. § 119, the content of which is incorporated by reference herein in its entirety.

BACKGROUND

1. Field

The disclosure relates to a cathode active material, a method of preparing the same, and a cathode and a secondary battery including the same.

2. Description of the Related Art

Lithium secondary batteries contain an electrolyte containing a flammable organic solvent. Accordingly, in the event of a short circuit, overheating and fire may occur. In this regard, all-solid-state batteries using a solid electrolyte instead of an electrolyte have been proposed.

Since all-solid-state batteries do not use flammable organic solvents, even when a short circuit occurs, the possibility of fire or explosion may be greatly reduced. Therefore, such an all-solid-state battery may greatly enhance safety as compared with a lithium-ion battery using an electrolytic solution.

All-solid-state batteries can be charged beyond the voltage limit of liquid electrolytes. Accordingly, high-voltage cathode materials can be applied and battery energy density can be further increased.

An all-solid-state battery including a metal oxide as an anode material requires lower battery driving voltage than batteries including a carbon-based anode material. Accordingly, there remains a need for an improved high-voltage cathode material.

SUMMARY

Provided are novel cathode active materials having excellent high voltage characteristics, low charge/discharge overvoltage, and improved voltage.

Provided is a cathode including the cathode active material.

Provided is a secondary battery including the cathode.

Provided is a method of preparing the cathode active material.

Provided is a method of preparing the secondary battery including the cathode.

Additional aspects will be set forth in part in the description which follows and, in part, will be apparent from the description, or may be learned by practice of the embodiments of the disclosure.

According to an aspect of an embodiment, a cathode active material includes a compound represented by Formula 1 and having an olivine structure:

$$Li_{1-\alpha}CO_{1-x-y}In_xM_yPO_4, \qquad \text{Formula 1}$$

wherein in Formula 1, $0 \le \alpha < 1$, $0.01 \le x \le 0.1$, and $0.01 \le y \le 0.1$, and M in Formula 1 is a divalent element, a trivalent element other than In, a tetravalent element, a pentavalent element, or a combination thereof.

According to another aspect, provided is a secondary battery including the cathode, an anode, and an electrolyte between the cathode and the anode.

Provided is a method of preparing a cathode active material, the method including: mixing an indium precursor, a metal precursor, a lithium precursor, a cobalt precursor, and a phosphorus precursor to prepare a precursor mixture; and heat-treating the precursor mixture to prepare the cathode active material, wherein a metal of the metal precursor is a divalent element, a trivalent element other than In, a tetravalent element, a pentavalent element, or a combination thereof.

The heat-treating may comprise heat-treating at about 600° C. to about 900° C. in an oxidizing atmosphere or an inert atmosphere.

Provided is a method of manufacturing a secondary battery, the method including: providing the cathode; providing an anode; providing a solid electrolyte between the cathode and the anode; and pressing the cathode, the anode, and the solid electrolyte together to manufacture the secondary battery.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
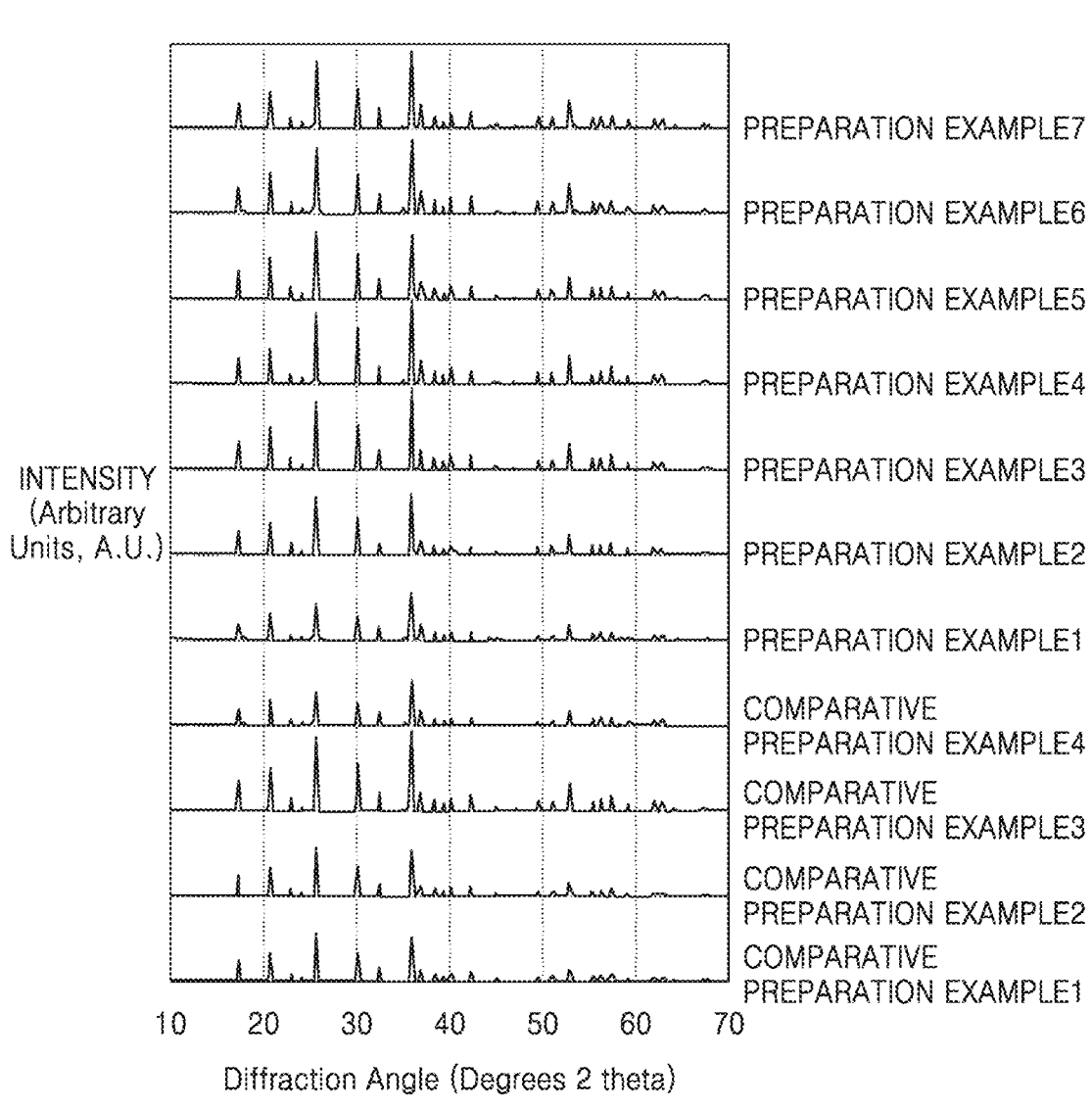
FIG. 1 is a graph of intensity (arbitrary units, a.u.) vs. diffraction angle (degrees $2\theta$) and shows X-ray diffraction analysis results for cathode active materials of Preparation Examples 1 to 7 and Comparative Preparation Examples 1 to 4.

Reference will now be made in detail to embodiments, examples of which are illustrated in the accompanying drawings, wherein like reference numerals refer to like elements throughout the specification. In this regard, the embodiments may have different forms and should not be construed as being limited to the descriptions set forth herein. Accordingly, the embodiments are merely described below, by referring to the figures, to explain various aspects. These embodiments are provided so that this disclosure will be thorough and complete, and will fully convey the scope of the invention to those skilled in the art. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

End points in ranges may be independently combined. "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a cathode active material according to an embodiment, a method of preparing the same, and a cathode and a secondary battery which include the same, will be described in further detail.

Phosphate cathode materials having an olivine structure have a low voltage of about 3 V as well as low electronic conductivity. Accordingly, there is a need for the development of an improved cathode material.

Olivine $LiCoPO_4$ material is theoretically capable of achieving a high voltage of 4.8 V and a high capacity of 169 mAh/g. Accordingly, research is being carried out on olivine $LiCoPO_4$ materials for use as a high-voltage cathode material. However, $LiCoPO_4$ has a low actual capacity (<100 mAh/g), and it is difficult to maintain capacity during electrochemical cycling, thus improved stability is desired.

Since $LiCoPO_4$ has insufficient structural stability, the discharge capacity of $LiCoPO_4$ obtained from a lithium battery is less than 50 mAh/g, and the voltage, high rate and lifespan characteristics of a secondary battery using $LiCoPO_4$ do not reach a satisfactory level. Accordingly, there is a need to improve the same.

The cathode active material according to an embodiment is provided to address this issue, and trivalent indium and a metal (M), which is a divalent element, a trivalent element, a tetravalent element, a pentavalent element, or a combination thereof, are introduced into $LiCoPO_4$ to induce changes in electronic and ionic structures, and electrochemical properties thereof are improved.

The cathode active material has a composition represented by Formula 1 and has an olivine structure. "Olivine" or "olivine structure" as used herein means that the compound has a crystal structure that is isostructural with olivine, $(Mg_xFe_{(1-x)})_2SiO_4$, wherein $0 \le x \le 1$.

$$Li_{1-\alpha}CO_{1-x-y}In_xM_yPO_4. \hspace{2cm} \text{Formula 1}$$

In Formula 1, $\alpha$, x, and y satisfy the conditions of $0 \le \alpha < 1$, $0.01 \le x \le 0.1$, and $0.01 \le y \le 0.1$, and M is a divalent element, a trivalent element, a tetravalent element, or a pentavalent element, and may be Nb, Ni, Ti, Mo, Al, Zn, Cs, Cr, Ag, Mn, Rb, Sn, Cs, Sr, Hf, Sn, Ir, Rb, Cu, Ca, Ga, Cd, Ta, Re, Fe, Rh, Au, Zr, or a combination thereof. M in Formula 1 may be Nb, Ni, Ti, Mo, or a combination thereof. $\alpha$ in Formula 1 may satisfy the condition of $0<\alpha<1$. $\alpha$ is, for example, 0.1 or 0.2. When a is within the above range, lithium may be in a deficient state. When lithium has a deficiency state, an ionic conductivity of the cathode active material is improved.

In Formula 1, x and y may be $0.01 \leq x \leq 0.05$ and $0.01 \leq y \leq 0.07$. The ratio of x to y (x:y) in Formula 1 may be about 1:1 to about 1:7, or about 1:1 to about 1:5. When the ratio of indium and metal is within the above range, a cathode active material having improved electrochemical properties may be obtained. Here, the ratio of x to y is, for example, a molar ratio or an atomic ratio of indium to M.

$\alpha$ in Formula 1 may be 0 or about 0.01 to about 0.3, or about 0.03 to about 0.22, and $(1-\alpha)$ in Formula 1 may be, for example, about 0.7 to about 0.99, about 0.75 to about 0.99, or about 0.78 to about 0.97.

The compound represented by Formula 1 may be, for example, compounds represented by Formulae 2 to 5:

$$Li_{1-\alpha}Co_{1-x-y}In_xNb_yPO_4 \qquad \text{Formula 2}$$

wherein, in Formula 2, $0 \leq \alpha \leq 1$, $0.01 \leq x \leq 0.1$, and $0.01 \leq y \leq 0.1$, $$Li_{1-\alpha}Co_{1-x-y}In_xTi_yPO_4 \qquad \text{Formula 3}$$

wherein, in Formula 3, $0 \leq \alpha \leq 1$, $0.01 \leq x \leq 0.1$, and $0.01 \leq y \leq 0.1$, $$Li_{1-\alpha}Co_{1-x-y}In_xMo_yPO_4 \qquad \text{Formula 4}$$

wherein, in Formula 4, $0 \leq \alpha \leq 1$, $0.01 \leq x \leq 0.1$, and $0.01 \leq y \leq 0.1$, and $$Li_{1-\alpha}Co_{1-x-y}In_xNi_yPO_4 \qquad \text{Formula 5}$$

wherein, in Formula 5, $0 \leq \alpha < 1$, $0.01 \leq x \leq 0.1$, and $0.01 \leq y \leq 0.1$.

$\alpha$ in Formulae 2 to 5 may each independently satisfy the condition of $0 < \alpha < 1$, and $(1-\alpha)$ in Formulae 2 to 5 may each independently be, for example, about 0.7 to about 0.99, about 0.75 to about 0.99, or about 0.78 to about 0.97.

Regarding the cathode active material according to an embodiment, indium is doped in $LiCoPO_4$ to increase a lattice volume and an electron conductivity. In addition, when a divalent element, a trivalent element, a tetravalent element, a pentavalent element, or a combination thereof, other than indium is doped, a cathode active material having a lithium deficiency is formed to adjust a charge balance of the cathode active material to zero. In the case of the cathode active material in which lithium deficiency is formed as described above, an average charge/discharge voltage and a discharge capacity are improved, and a lifespan characteristic of a secondary battery having a cathode comprising the cathode active material can be improved.

The cathode active material may have improved structural stability, have an olivine crystal structure, and the lifespan characteristics of a lithium secondary battery including the cathode active material may be improved. In addition, since the cathode active material maintains a high voltage, an energy density of the lithium secondary battery including the cathode active material may be improved.

The average discharge voltage of the cathode active material according to an embodiment may be, for example, about 4.4 volts (V) or greater, about 4.6 V or greater, about 4.6 V to about 5.2 V, or about 4.7 V to about 4.9 V. Within these ranges of a high average discharge voltage, the energy density of the secondary battery including the cathode active material may be improved. The average discharge voltage may be, for example, a voltage obtained by dividing a value obtained by integrating an area of the voltage profile by a discharge capacity, in a discharge profile graph for a discharge voltage and a specific capacity. Alternatively, in a graph in which the y-axis indicates the value obtained by differentiating the amount of charge (Q) with the voltage (V) (dQ/dV), and the x-axis indicates the voltage (V), the average discharge voltage is the voltage corresponding to the x value when the y-axis has the maximum value.

The cathode active material may be $Li_{1-\alpha}Co_{0.9}In_{0.05}Nb_{0.05}PO_4$, $Li_{1-\alpha}Co_{0.94}In_{0.01}Ti_{0.05}PO_4$, $Li_{1-\alpha}Co_{0.9}In_{0.05}Ni_{0.05}PO_4$, $Li_{1-\alpha}Co_{0.98}In_{0.01}Mo_{0.01}PO_4$, $Li_{1-\alpha}Co_{0.96}In_{0.01}Mo_{0.03}PO_4$, $Li_{1-\alpha}Co_{0.96}In_{0.01}Ti_{0.03}PO_4$, $Li_{1-\alpha}Co_{0.92}In_{0.01}Ti_{0.07}PO_4$, $Li_{1-\alpha}Co_{0.92}In_{0.01}Nb_{0.07}PO_4$, $Li_{1-\alpha}Co_{0.94}In_{0.01}Nb_{0.05}PO_4$, $Li_{1-\alpha}Co_{0.9}In_{0.05}Ti_{0.05}PO_4$, $Li_{1-\alpha}Co_{0.94}In_{0.01}Ni_{0.05}PO_4$, $Li_{1-\alpha}Co_{0.94}In_{0.01}Mo_{0.05}PO_4$, or a combination thereof, wherein $0 \leq \alpha < 1$. In the formula, $1-\alpha$ may be, for example, about 0.7 to about 0.99, about 0.75 to about 0.99, or about 0.78 to about 0.97.

The cathode active material may be $Li_{0.8}Co_{0.9}In_{0.05}Nb_{0.05}PO_4$, $Li_{0.82}Co_{0.9}In_{0.06}Nb_{0.04}PO_4$, $Li_{0.89}Co_{0.94}In_{0.01}Ti_{0.05}PO_4$, $Li_{0.9}Co_{0.94}In_{0.02}Ti_{0.04}PO_4$, $Li_{0.95}Co_{0.9}In_{0.05}Ni_{0.05}PO_4$, $Li_{0.94}Co_{0.9}In_{0.06}Ni_{0.04}PO_4$, $Li_{0.97}Co_{0.98}In_{0.01}Mo_{0.01}PO_4$, $Li_{0.95}Co_{0.97}In_{0.01}Mo_{0.02}PO_4$, $Li_{0.93}Co_{0.96}In_{0.01}Mo_{0.03}PO_4$, $Li_{0.92}Co_{0.95}In_{0.02}Mo_{0.03}PO_4$, $Li_{0.97}Co_{0.9}In_{0.01}Ti_{0.01}PO_4$, $Li_{0.95}Co_{0.97}In_{0.01}Ti_{0.02}PO_4$, $Li_{0.93}Co_{0.96}In_{0.01}Ti_{0.03}PO_4$, $Li_{0.92}Co_{0.95}In_{0.02}Ti_{0.03}PO_4$, $Li_{0.78}Co_{0.92}In_{0.01}Nb_{0.07}PO_4$, $Li_{0.8}Co_{0.92}In_{0.02}Nb_{0.06}PO_4$, $Li_{0.84}Co_{0.94}In_{0.01}Nb_{0.05}PO_4$, $Li_{0.6}Co_{0.94}In_{0.02}Nb_{0.04}PO_4$, $Li_{0.85}Co_{0.9}In_{0.05}Ti_{0.05}PO_4$, $Li_{0.86}Co_{0.9}In_{0.06}Ti_{0.04}PO_4$, $Li_{0.99}Co_{0.94}In_{0.01}Ni_{0.05}PO_4$, $Li_{0.98}Co_{0.94}In_{0.02}Ni_{0.04}PO_4$, $Li_{0.89}Co_{0.94}In_{0.01}Mo_{0.05}PO_4$, $Li_{0.9}Co_{0.94}In_{0.02}Mo_{0.04}PO_4$, $Li_{0.85}Co_{0.92}In_{0.01}Ti_{0.07}PO_4$, or a combination thereof.

The cathode active material has a crystal structure belonging to an orthorhombic crystal system and may belong to a Pnma space group. In addition, the specific capacity of the cathode active material at room temperature (25° C.) may be, for example, about 130 milliampere-hours per gram (mAh/g) or greater, about 130 mAh/g to about 170 mAh/g, or about 132 mAh/g to about 164 mAh/g. Within these ranges of a high specific capacity, the energy density of the secondary battery may be increased. The specific capacity may be, for example, an initial discharge capacity.

According to another embodiment, a cathode including the cathode active material is provided.

The cathode may include, for example, a cathode current collector and a cathode active material layer disposed on one or both surfaces of the cathode current collector. The cathode active material layer may include the cathode active material. Depending on the method of preparing the cathode, the cathode current collector may be omitted.

A content of the cathode active material included in the cathode active material layer may be, for example, about 30 weight percent (wt %) to about 100 wt %, or about 50 wt % to about 99 wt %, or about 60 wt % to about 96 wt %, each based on a total weight of the cathode active material layer.

The cathode active material layer may or may not additionally include a conductive material and a binder.

A content of the conductive material included in the cathode active material layer may be, 0 wt % to about 40 wt %, about 0.1 wt % to about 30 wt %, about 0.5 wt % to about 20 wt %, or about 1 wt % to about 10 wt %, each based on the total weight of the cathode active material layer.

A content of the binder included in the cathode active material layer may be, 0 wt % to about 30 wt %, about 0.1 wt % to about 20 wt %, or about 0.5 wt % to about 10 wt %, based on the total weight of the cathode active material layer.

The types of the conductive material and the binder included in the cathode active material layer are not particularly limited, and any suitable conductive material or binder used in the cathode in the art may be used.

The cathode may provide a high average discharge voltage by including the cathode active material.

According to another embodiment, provided is a secondary battery including a cathode, an anode, and an electrolyte disposed between the cathode and the anode, wherein the cathode includes a cathode active material according to an embodiment.

The secondary battery may be, for example, a lithium secondary battery or an all-solid-state battery. The secondary battery may be, for example, a multi-layer-ceramic (MLC) battery or a thin film (i.e., film) battery.

The MLC battery may include, for example, a plurality of cathode layers (i.e., cathodes), a plurality of anode layers (i.e., anodes) alternately disposed between the plurality of cathode layers, and a solid electrolyte layer (i.e., solid electrolyte) disposed between the plurality of cathode layers and the plurality of anode layers.

A solid electrolyte included in the MLC battery may be, for example, an oxide-based (i.e., oxide) solid electrolyte.

An anode included in an MLC battery may comprise an anode active material comprising a lithium metal phosphate, a lithium metal oxide, a metal oxide, or a combination thereof.

The MLC battery may be, for example, a sintered product of a laminate in which a cathode active material precursor, an anode active material precursor, and a solid electrolyte precursor are sequentially stacked, or a sintered product of a laminate in which a cathode active material, an anode active material, and a solid electrolyte are sequentially stacked.

The MLC battery includes, for example, a laminate structure in which a plurality of unit cells are arranged such that a cathode active material layer faces an anode active material layer, wherein, in each of the unit cells, a cathode including a cathode active material layer, a solid electrolyte, and an anode including an anode active material layer are sequentially, continuously arranged. The MLC battery may further include, for example, a cathode current collector and/or an anode current collector. When the MLC battery includes a cathode current collector, the cathode active material layer may be disposed on opposite surfaces of the cathode current collector. When the MLC battery includes an anode current collector, the anode active material layer may be disposed on opposite surfaces of the anode current collector. When the MLC battery further includes a cathode current collector and/or an anode current collector, high rate characteristics of the battery may be further improved.

In the MLC battery, unit cells are stacked by disposing a current collector layer as either or both of the uppermost layer and the lowermost layer of a laminate or by interposing a metal layer in the laminate.

The MLC battery or the thin film battery may be a small or ultra-small battery applicable as, for example, an application power source for the Internet of Things (IoT) or a wearable device power source.

The MLC battery or the thin film battery may also be used as medium and large-sized battery, such as for an electric vehicles (EVs) or an energy storage system (ESS).

The secondary battery may be an MLC solid battery including at least a first unit cell and a second unit cell, and an internal current collector layer, wherein each of the first unit cell and the second unit cell includes a cathode layer, a solid electrolyte layer, and an anode layer stacked sequentially, and the internal current collector layer is disposed between the first unit cell and the second unit cell in such a way that the internal current collector layer is in contact with the cathode layer of each of the first unit cell and the second unit cell, or is in contact with the anode layer of each of the first unit cell and the second unit cell.

The anode active material of the anode active material layer may be, for example, $Li_{4/3}Ti_{5/3}O_4$, $LiTiO_2$, $LiM1_sM2_tO_u$ (wherein M1 and M2 are transition metals, and s, t, and u are positive numbers), $TiO_x$ (wherein $0<x\leq3$), $Li_xV_2(PO_4)_3$ (wherein $0<x\leq5$), or carbon (including graphite). The anode active material may be $Li_{4/3}Ti_{5/3}O_4$, $LiTiO_2$, or a combination thereof.

The current collector layer may be any current collector suitable as a cathode current collector or an anode current collector. The current collector layer may comprise, for example, any metal of Ni, Cu, Ag, Pd, Au, Pt, Al, or a combination thereof. The current collector layer may comprise an alloy comprising, for example, any of Ni, Cu, Ag, Pd, Au, Pt, an alloy thereof, or a combination thereof. The alloy may be, for example, an Ag/Pd alloy. These metals and alloys may be singular or may be a mixture of two or more. The material for the current collector layer as the cathode current collector may be the same as or different from the material for the current collector layer as the anode current collector. In the case of an alloy or mixed powder containing Ag and Pd, the melting point may be continuously or arbitrarily adjustable from the melting point of silver (962° C.) to the melting point (1550° C.) of palladium depending on the ratio of Ag to Pd thereof, enabling the adjustment of the melting point to match with the batch sintering temperature, and due to a high electronic conductivity, an increase in an internal resistance of the battery can be suppressed.

The solid electrolyte comprises an ion conductive inorganic material, for example, an oxide-based (i.e., oxide) solid electrolyte.

The oxide-based solid electrolyte may be, for example, $Li_{1+x+y}Al_xTi_{2-x}Si_yP_{3-y}O_{12}$ ($0<x<2$ and $0\leq y<3$), $BaTiO_3$, $Pb(Zr_pTi_{1-p})O_3$ (PZT, $0\leq p\leq1$), $Pb_{1-x}La_xZr_{1-y}Ti_yO_3$ (PLZT, $0\leq x<1$ and $0\leq y<1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, lithium phosphate ($Li_3PO_4$), lithium titanium phosphate ($Li_xTi_y(PO_4)_3$, $0<x<2$, and $0<y<3$), lithium aluminum titanium phosphate ($Li_xAl_yTi_z(PO_4)_3$, $0<x<2$, $0<y<1$, and $0<z<3$), $Li_{1+x+y}(Al_pGa_{1-p})_x(Ti_qGe_{1-q})_{2-x}Si_yP_{3-y}O_{12}$ ($0\leq x\leq1$, $0\leq y\leq1$, $0\leq p\leq1$, and $0\leq q\leq1$), lithium lanthanum titanate ($Li_xLa_yTiO_3$, $0<x<2$, and $0<y<3$), lithium germanium thiophosphate ($Li_xGe_yP_zS_w$, $0<x<4$, $0<y<1$, $0<z<1$, and $0<w<5$), lithium nitride-based glass ($Li_xN_y$, $0<x<4$ and $0<y<2$), $SiS_2$ ($Li_xSi_yS_z$, $0<x<3$, $0<y<2$, and $0<z<4$), $P_2S_5$-based glass ($Li_xP_yS_z$, $0<x<3$, $0<y<3$, and $0<z<7$), $Li_2O$, $LiF$, $LiOH$, $Li_2CO_3$, $LiAlO_2$, $Li_2O$—$Al_2O_3$—$SiO_2$—$P_2O_5$—$TiO_2$—$GeO_2$-based ceramic, a garnet-based ceramic, $Li_{3+x}La_3M_2O_{12}$ (M=Te, Nb, or Zr, x is an integer from 1 to 10), or a combination thereof. As used herein, the term "garnet," "garnet-based" or "garnet-type" means that the compound is isostructural with garnet, e.g., $Mg_3Al_2(SiO_4)_3$.

The solid electrolyte may be, for example, a lithium compound of $Li_{3.25}Al_{0.25}SiO_4$, $Li_3PO_4$, $LiP_xSi_yO_z$ (wherein x, y, and z are positive numbers), or a combination thereof. The solid electrolyte may be, for example, $Li_{3.5}P_{0.5}Si_{0.5}O_4$.

Figure 5:
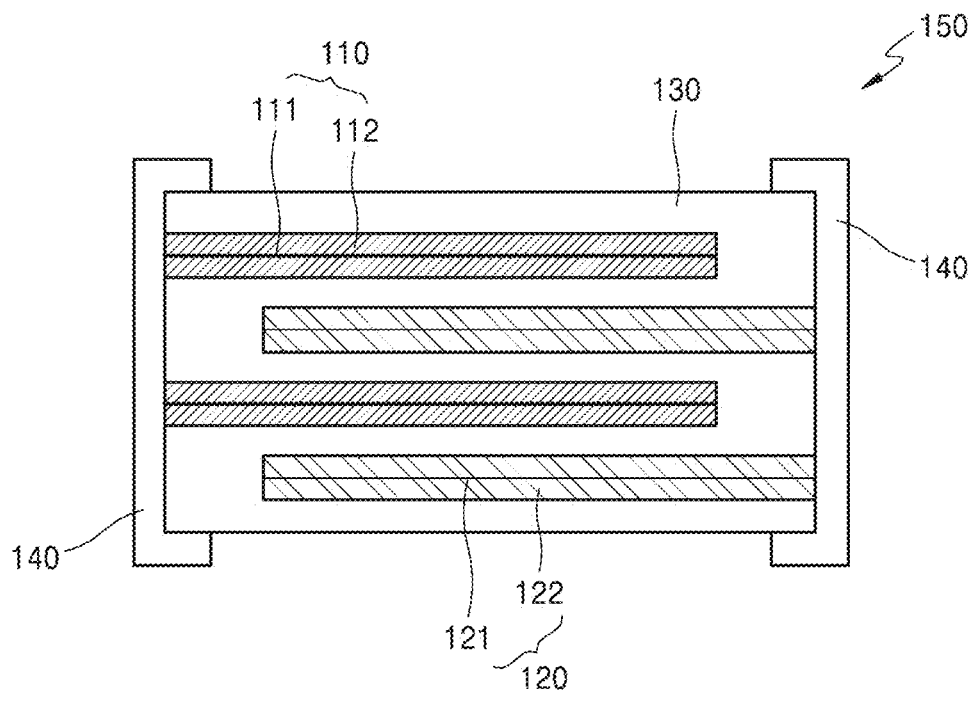
FIG. 5 is a schematic view of an embodiment of a structure of a multi-layer ceramic-type battery.

FIG. 5 schematically shows a cross-sectional structure of an MLC solid battery according to an embodiment.

Referring to FIG. 5, an MLC battery may be manufactured by sequentially stacking an oxide electrode and a solid electrolyte and then simultaneously heat-treating the same.

Referring to FIG. 5, a cathode 110 is formed by disposing a cathode active material layer 112 containing a cathode active material according to an embodiment on a first surface of a cathode current collector 111. An anode 120 is formed by laminating an anode active material layer 122 on a first surface of an anode current collector 121. A solid electrolyte 130 is disposed between the cathode 110 and the anode 120. The external electrodes 140 are formed at both ends of the battery body 150. An external electrode 140 is connected to the cathode 110 and the anode 120, each of which an end is exposed to the outside of the battery body 150, so as to electrically connect the cathode 110, the anode 120, and an external device to one another. From among a pair of external electrodes 140, a first electrode is connected to the cathode 110 of which an end is exposed to the outside of the battery body 150, and a second electrode is connected to the anode 120 of which an end is exposed to the outside of the battery body 150.

Figure 6:
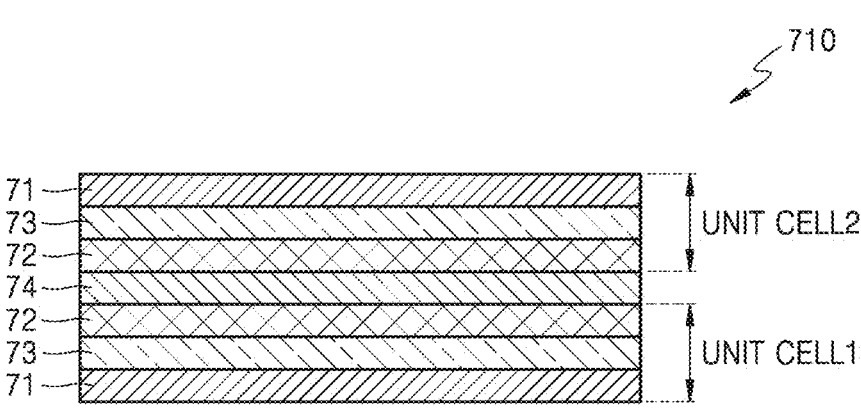
FIGS. 6 and 7 are each a schematic view of an embodiment of a structure of a secondary battery.
Figure 7:
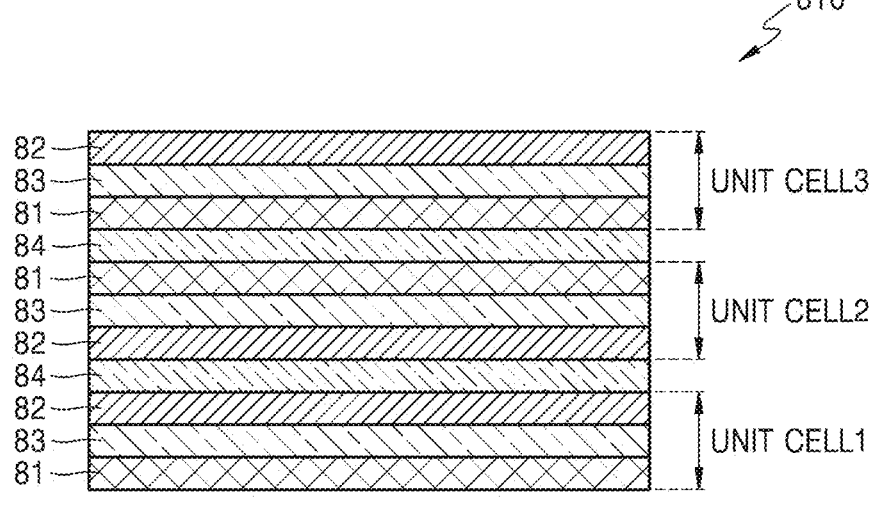

FIG. 6 schematically shows a cross-sectional structure of an MLC solid battery 710 according to an embodiment, and FIG. 7 schematically shows a cross-sectional structure of an MLC solid battery 810 according to an embodiment.

As shown in FIG. 6, in the MLC solid battery 710, a unit cell 1 and the unit cell 2 are laminated with an internal current collector layer 74 in between. Each of the unit cell 1 and the unit cell 2 includes a cathode 71, a solid electrolyte 73 and an anode 72, which are laminated sequentially.

The cathode 71 contains a cathode active material according to an embodiment.

The unit cell 1, the unit cell 2, and the internal current collector 74 are laminated in such a way that the anode 72 of the unit cell 2 is adjacent to a first side of the internal current collector 74 (e.g., upper surface in FIG. 6) and the anode 72 of the unit cell 1 is adjacent to a second side (e.g., lower surface in FIG. 6) of the internal current collector 74.

In FIG. 6, the internal current collector 74 is disposed to be in contact with the anode 72 of each of the unit cell 1 and the unit cell 2. In some embodiments, the internal current collector 74 may be disposed to be in contact with the cathode 71 of each of the unit cell 1 and the unit cell 2. The internal current collector 74 includes an electronically conductive material, such as Ni, Cu, Ag, Pd, Au, Pt, Al, an alloy thereof, or a combination thereof.

The internal current collector 74 may further include an ion conductive material. When an ion conductive material is included, improved voltage stabilization may be provided.

In the MLC solid battery 710, same polarities are disposed on opposite sides of the internal current collector 74. Accordingly, a monopolar MLC solid battery 710 may be obtained in which a plurality of unit cells are connected in parallel, while the internal current collector 74 is disposed therebetween. Thereby, the MLC solid battery 710 may be a high-capacity MLC solid battery.

In the MLC solid battery 710, the internal current collector 74 interposed between the unit cell 1 and the unit cell 2 includes an electron conductive material. Accordingly, two adjacent unit cells may be electrically connected in parallel and at the same time, the cathodes 71 or the anodes 72 of each of the adjacent two cells may be ionically connected to each other. As a result, the potential of the cathodes 71 or anodes 72, which are adjacent to one another, may be averaged through the internal current collector 74, and thus, a stable output voltage may be obtained.

In addition, without an external current collecting member such as a tab, unit cells of the MLC solid battery 10 may be electrically connected in parallel. Accordingly, the MLC solid battery 710 may be excellent in space utilization and cost-effectiveness.

Referring to FIG. 7, the laminate includes a cathode 81, an anode 82, a solid electrolyte 83, and an internal current collector 84. These laminates may be provided by thermally compressing to obtain a laminated ceramic solid battery 810. The cathode 81 comprises one sheet of the cathode, and the anode 82 comprises two sheets of an anode. The cathode 81 contains the cathode active material according to an embodiment.

Figure 8A:
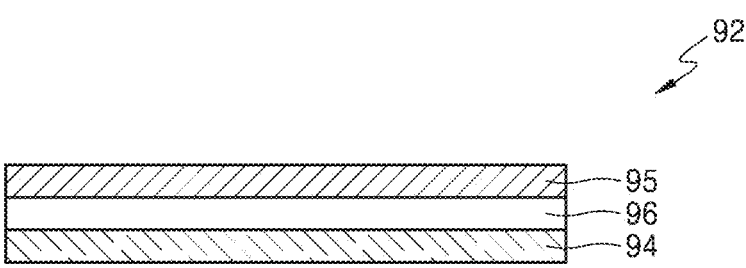
FIGS. 8A and 8B are each a schematic view of an embodiment of a structure of a secondary battery.
Figure 8B:
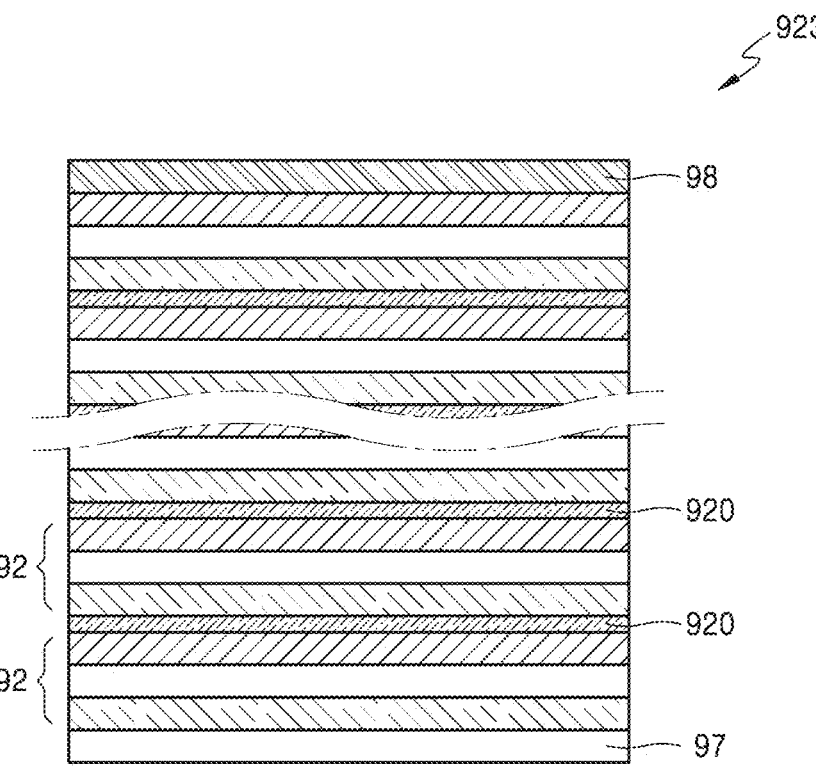

FIGS. 8A and 8B show a laminate of an all-solid-state secondary battery according to an embodiment. The cathode active material layer of FIGS. 8A and 8B includes a cathode active material layer according to an embodiment.

FIG. 8A shows a unit cell 92, which is the most basic unit of the all-solid-state secondary battery. The unit cell 92 has a cathode active material layer 94, a solid electrolyte 96, and an anode active material layer 95 are sequentially laminated.

FIG. 8B shows the structure of a laminate 923 of an all-solid-state secondary battery.

The all-solid-state secondary battery has a lower end at which a cathode lead electrode in contact with the cathode active material layer is provided and an upper end at which an anode lead electrode in contact with an anode active material layer is provided. The terms "the upper end and the lower end" used in the present specification are used to describe a relative positional relationship.

The all-solid-state secondary battery comprises a stack structure comprising a plurality of unit cells, each unit cell comprising a cathode comprising a cathode active material layer, a solid electrolyte, and an anode comprising an anode active material layer, wherein the solid electrolyte is between the cathode and the anode. Optionally, the cathode active material layer and an anode active material layer of an adjacent unit cell may face each other. Thus, the plurality of unit cells comprises a first unit cell and an adjacent second unit cell, and wherein the cathode active material layer of the first unit cell is adjacent the anode active material layer of the adjacent second unit cell.

Referring to FIG. 8B, the laminate 923 includes a plurality of unit cells 92, the cathode active material layer 94 and the anode active material layer 95 of each thereof are laminated to face each other, and an uppermost layer and a lowermost layer are each a current collector layer. One of the uppermost and lowermost current collector layers is connected to the cathode active material layer to become a cathode current collector, and the other is connected to the anode active material layer to become an anode current collector. The lowermost current collector layer 97 is in contact with the cathode active material layer 94 to become a cathode current collector, and the uppermost current collector layer 98 is into contact with the anode active material layer 95 to become an anode current collector. A current collector layer can function as a lead electrode.

In FIG. 8B, the lowermost current collector layer 97 may function as a cathode lead, and the uppermost current collector layer 98 may function as an anode lead. In some embodiments, a lead may be separately provided on the current collector layer. For example, a cathode lead in contact with the lowermost current collector layer 97 may be provided at the lower end of the laminate 923 and an anode lead in contact with the uppermost current collector layer 98 may be provided at the upper end of the laminate 923.

The laminate 923 of FIG. 8B includes a metal layer 920 located between unit cells 92. By locating the metal layer 920 therebetween, the movement of ions are limited within individual cell units, which can function as a series-type all-solid-state secondary battery. Although the laminate 923 of FIG. 8B has a current collector layer, the current collector layer is optional as described above.

Regarding the laminate 923 of an all-solid-state secondary battery, when the number of unit cells 92 is two or more, a serial-type all-solid-state secondary battery may be formed. The number of unit cells may be changed based on the desired capacity or voltage of the all-solid-state secondary battery.

In an embodiment, the secondary battery may be, for example, an all-solid-state secondary battery including a cathode including a cathode active material layer, an anode current collector layer, and an anode including a first anode active material layer, a second anode active material layer, or a combination thereof, a solid electrolyte disposed between the cathode and the anode, wherein the cathode active material layer comprises a cathode active material according to an embodiment.

The first anode active material layer may include a carbon-based (i.e., carbonaceous) anode active material, a metal or metalloid anode active material, or a combination thereof.

The carbon-based anode active material may comprise an amorphous carbon, a crystalline carbon, or a combination thereof, and the metal or metalloid anode active material may comprise gold (Au), platinum (Pt), palladium (Pd), silicon (Si), silver (Ag), aluminum (Al), bismuth (Bi), tin (Sn), zinc (Zn), or a combination thereof.

The all-solid-state secondary battery may further include, for example, a second anode active material layer disposed between the anode current collector and the first anode active material layer, between the solid electrolyte and the first anode active material layer, or a combination thereof. The second anode active material layer may be a metal layer including lithium or a lithium alloy.

Figure 9:
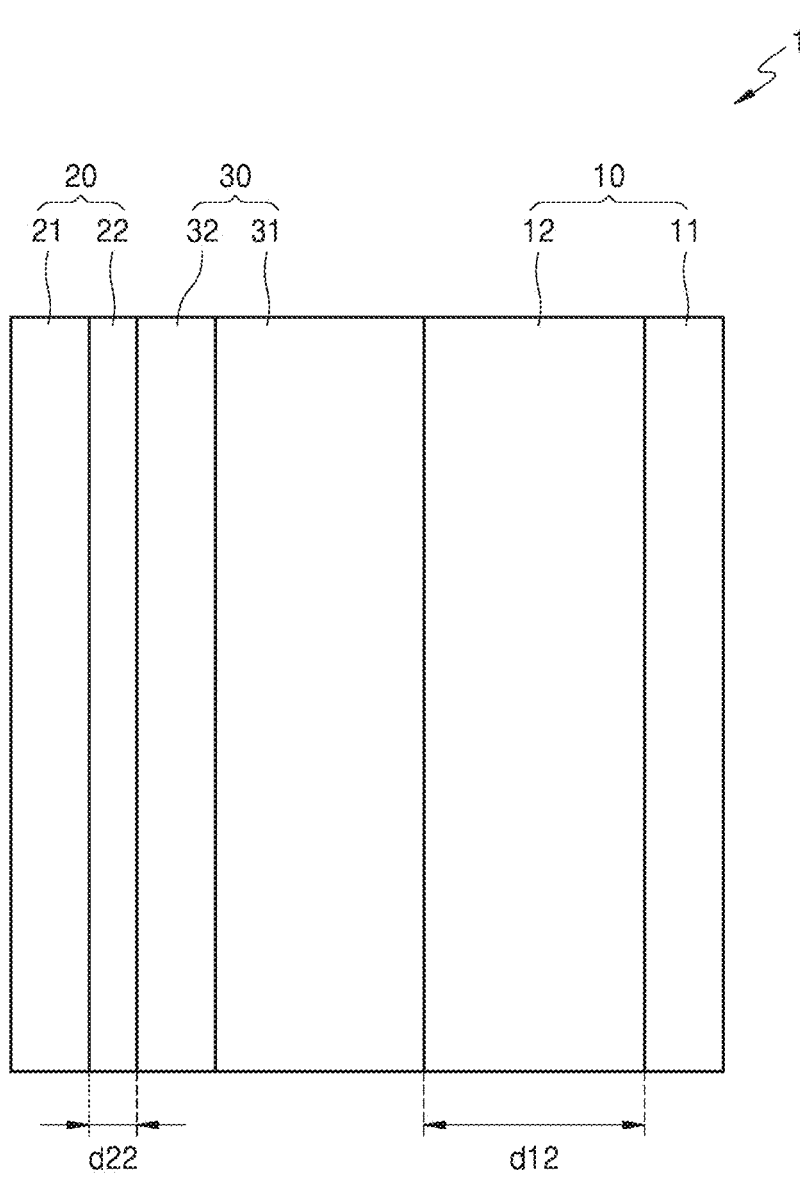
FIGS. 9 to 12 are each a schematic view of an embodiment of a structure of an all-solid-state secondary battery.
Figure 10:
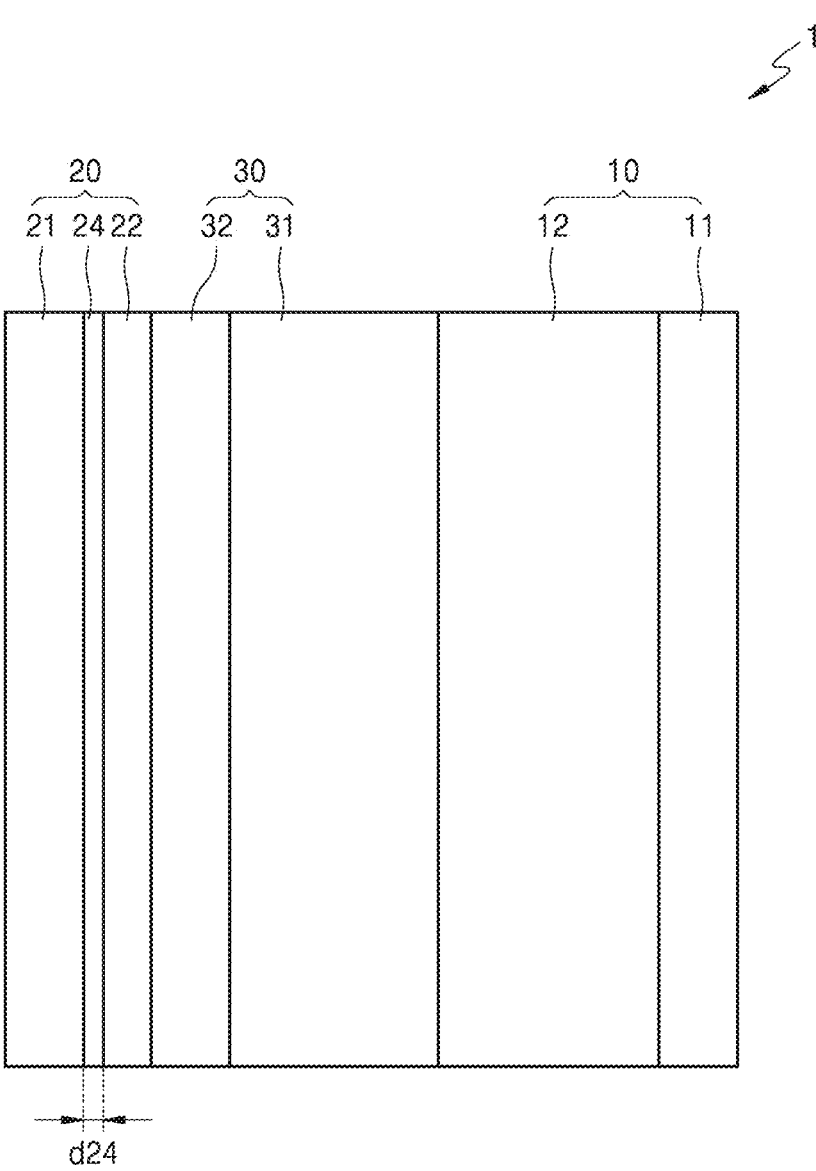
Figure 11:
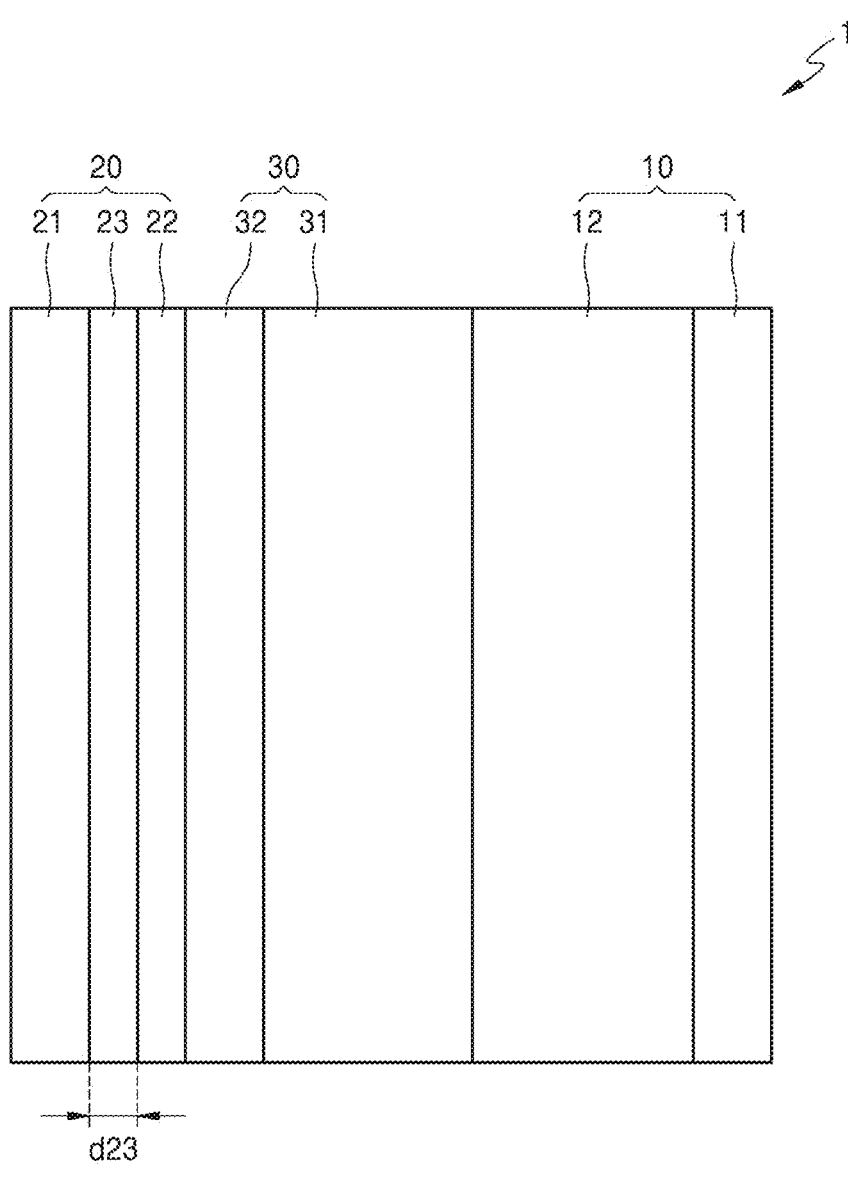

Referring to FIGS. 9 to 11, the all-solid-state secondary battery 1 includes: an anode 20 including an anode current collector 21 and a first anode active material layer 22; a cathode 10 including a cathode current collector 11 and a cathode active material layer 12; and a solid electrolyte 30 disposed between the anode 20 and the cathode 10. The cathode 10 may comprise a solid electrolyte. The cathode active material layer 12 of FIGS. 10 to 11 includes a cathode active material according to an embodiment. The cathode may comprise, for example, a cathode active material, a solid electrolyte, and a conductive material.

Anode Layer

Referring to FIGS. 9 to 11, the anode 20 includes an anode current collector 21 and a first anode active material layer 22, and the first anode active material layer 22 includes an anode active material. The anode current collector 21 may be omitted.

An anode active material included in the first anode active material layer 22 may be, for example, in a form of a particle. The anode active material in the form of a particle may have an average particle diameter of, for example, about 4 micrometers (μm) or less, about 3 μm or less, about 2 μm or less, about 1 μm or less, or about 900 nanometers (nm) or less. The average particle diameter of the anode active material having a particle shape may be, for example, about 10 nm to about 4 μm, about 10 nm to about 2 μm, about 10 nm to about 1 μm, or about 10 nm to about 900 nm. When the average particle diameter of the anode active material is within these ranges, reversible absorption and/or desorption of lithium during a charge/discharge process may further be facilitated. The average particle diameter of the anode active material may be a median diameter (D50) as measured by, for example, a laser-diffraction particle size distribution analyzer.

The anode active material included in the first anode active material layer 22 may include, for example, a carbon-based anode active material, a metal or metalloid anode active material, or a combination thereof.

The carbonaceous anode active material may be, for example, an amorphous carbon. Examples of the amorphous carbon may be carbon black (CB), acetylene black (AB), furnace black (FB), ketjen black (KB), or graphene, but embodiments are not limited thereto, and any material suitable as the amorphous carbon in the art may be used. The amorphous carbon refers to carbon without crystallinity or with very low crystallinity, and is distinguished from crystalline carbon or graphitic carbon.

The metal or metalloid anode active material may include gold (Au), platinum (Pt), palladium (Pd), silicon (Si), silver (Ag), aluminum (Al), bismuth (Bi), tin (Sn), zinc (Zn), or a combination thereof, but embodiments are not limited thereto, and any suitable metal anode active material or metalloid anode active material capable of forming an alloy or a compound with lithium in the art may be used. For example, nickel (Ni) does not form an alloy with lithium and thus is not the metal anode active material.

The first anode active material layer 22 may include a single kind of anode active material or a mixture of a plurality of different anode active materials of the afore-mentioned anode active materials. For example, the first anode active material layer 22 includes the amorphous carbon alone, or gold (Au), platinum (Pt), palladium (Pd), silicon (Si), silver (Ag), aluminum (Al), bismuth (Bi), tin (Sn), zinc (Zn), or a combination thereof. In an embodiment, the first anode active material layer 22 may include a mixture of the amorphous carbon with gold (Au), platinum (Pt), palladium (Pd), silicon (Si), silver (Ag), aluminum (Al), bismuth (Bi), tin (Sn), zinc (Zn), or a combination thereof. The ratio of the mixture of the amorphous carbon and gold may be, for example, a weight ratio of about 10:1 to about 1:2, about 5:1 to about 1:1, or about 4:1 to about 2:1, but is not necessarily limited to these ranges. The ratio may vary depending on the characteristics of the all-solid-state secondary battery 1. When the anode active material has a composition as described above, the all-solid-state secondary battery 1 may have further improved cycle characteristics.

The anode active material included in the first anode active material layer 22 may include, for example, a mixture of a first particle comprising an amorphous carbon and a second particle comprising a metal or metalloid. Examples of the metal or metalloid may be gold (Au), platinum (Pt), palladium (Pd), silicon (Si), silver (Ag), aluminum (Al), bismuth (Bi), tin (Sn), zinc (Zn), or a combination thereof. For example, the metalloid may be a semiconductor. A content of the second particle may be in a range of about 8 wt % to about 60 wt %, about 10 wt % to about 50 wt %, about 15 wt % to about 40 wt %, or about 20 wt % to about 30 wt %, based on a total weight of the mixture. When the second particle has the content in this range, for example, the cycle characteristics of the all-solid-state secondary battery 1 are further improved.

The first anode active material layer includes, for example, a binder. The binder may be, for example, styrene butadiene rubber (SBR), polytetrafluoroethylene (PTFE), polyvinylidene fluoride (PVDF), polyethylene, a vinylidene fluoride/hexafluoropropylene copolymer, polyacrylonitrile, polymethyl methacrylate, or a combination thereof, but is not limited thereto. The binder may be any suitable material that is used as a binder in the art. The binder may comprise a single binder or a plurality of different binders.

Since the first anode active material layer 22 includes a binder, the first anode active material layer 22 is stabilized on the anode current collector 21. In addition, despite a change in volume and/or relative position of the first anode active material layer 22 during charge and discharge, cracking of the first anode active material layer 22 is suppressed. For example, in a case where the first anode active material layer 22 does not include a binder, the first anode active material layer 22 may be easily separated from the anode current collector 21. The portion of the first anode active material layer 22, where the first anode active material layer 22 is separated from the anode current collector 21, is exposed to and comes into contact with the solid electrolyte 30, thereby increasing the possibility of a short circuit. The first anode active material layer 22 is formed by, for example, coating, on the anode current collector 21, a slurry in which materials of the first anode active material layer 22 are dispersed, and drying the slurry. By the inclusion of a binder in the first anode active material layer 22, the anode active material may be stably dispersed in the slurry. For example, when the slurry is coated on the anode current collector 21 by a screen printing method, clogging of the screen (e.g., clogging by an aggregate of the anode active material) may be suppressed.

A thickness d22 of the first anode active material layer 22 may be, for example, about 50% or less, about 30% or less, about 10% or less, or about 5% or less of a thickness d12 of the cathode active material layer. The thickness d22 of the first anode active material layer 22 may be, for example, in a range of about 1 μm to about 20 μm, about 2 μm to about 10 μm, or about 3 μm to about 7 μm. When the thickness d22 of the first anode active material layer is within the above range, the cycle characteristics of the all-solid-state secondary battery 1 are excellent.

A charge capacity of the first anode active material layer 22 may be, for example, about 50% or less, about 40% or less, about 30% or less, about 20% or less, about 10% or less, about 5% or less, or about 2% or less of a charge capacity of the cathode active material layer 12. The charge capacity of the first anode active material layer 22 may be, for example, about 0.1% to about 50%, about 0.1% to about 30%, about 0.1% to about 10%, about 0.1% to about 5%, or about 0.1% to about 2% of the charge capacity of the cathode active material layer 12. When the charge capacity of the first anode active material layer 22 is within the above range, the cycle characteristics of the all-solid-state secondary battery 1 are excellent. The charge capacity of the cathode active material layer 12 is obtained by multiplying the specific charge capacity (mAh/g) of the cathode active material by a mass of the cathode active material in the cathode active material layer 12. For example, the anode current collector layer 21 may be formed of a material that does react with lithium to form an alloy or a compound. Examples of the material of the anode current collector 21 may be copper (Cu), stainless steel, titanium (Ti), iron (Fe), cobalt (Co), nickel (Ni), or a combination thereof, but embodiments are not limited thereto, and any material suitable as an electrode current collector in the art may be used. The anode current collector 21 may comprise one of the aforementioned examples of the metal, or an alloy or a coating material of at least two metals of the examples of the metal. The anode current collector 21 may be, for example, in a form of a plate or a foil.

The first anode active material layer 22 may further include an additive used in an all-solid-state secondary battery of the related art, for example, a filler, a dispersant, an ion-conductive agent, or a combination thereof.

Referring to FIG. 10, the all-solid-state secondary battery 1 may further include, for example, a thin film (i.e., film) 24 including an element capable of forming an alloy with lithium on the anode current collector 21. The thin film 24 may be placed between the anode current collector 21 and the first anode active material layer 22. The thin film 24 includes, for example, an element capable of forming an alloy with lithium. Examples of the element capable of forming an alloy with lithium may include, but are not limited to, gold, silver, zinc, tin, indium, silicon, aluminum, bismuth, or a combination thererof. Any suitable element may be used as long as it forms an alloy with lithium in the art. The thin film 24 may comprise one of the aforementioned metals, or an alloy of the aforementioned metals. As the thin film 24 is disposed on the anode current collector 21, for example, the plated form of a second anode active material layer (not shown) plated between the thin film 24 and the first anode active material layer 22 may be further planarized, and the cycle characteristics of the all-solid-state secondary battery 1 may be further improved.

A thickness d24 of the thin film 24 may be, for example, about 1 nm to about 800 nm, about 10 nm to about 700 nm, about 50 nm to about 600 nm, or about 100 nm to about 500 nm. When the thickness of the thin film 24 is within the above range, the energy density and cycle characteristics of an all-solid-state battery are excellent. The thin film 24 may be disposed on the anode current collector 21 by, for example, a vacuum deposition method, a sputtering method, a plating method, or a combination thereof, but the deposition method is not necessarily limited to these methods. Any suitable method capable of forming the thin film 24 in the art may be used.

Referring to FIG. 11, the all-solid-state secondary battery 1 may further include, for example, a second anode active material layer 23 disposed between the anode current collector 21 and the solid electrolyte 30 by charging. The all-solid-state secondary battery 1 may further include, for example, a second anode active material layer 23 plated between the anode current collector 21 and the first anode active material layer 22 by charging. The second anode active material layer 23 may be, for example, a plated lithium layer.

The second anode active material layer 23 is a metal layer comprising lithium or a lithium alloy. Accordingly, since the second anode active material layer 23 is a metal layer comprising lithium, the second anode active material layer 23 may act as, for example, a lithium reservoir. Examples of the lithium alloy may include, but are not limited to, a Li—Al alloy, a Li—Sn alloy, a Li—In alloy, a Li—Ag alloy, a Li—Au alloy, a Li—Zn alloy, a Li—Ge alloy, a Li—Si alloy, or a combination thereof. Any suitable lithium alloy may be used as it is used in the art. The second anode active material layer 23 may comprise lithium or one of the aforementioned alloys, or may comprise two or more different aforementioned alloys.

A thickness d23 of the second anode active material layer is not particularly limited, but may be, for example, about 10 μm to about 200 μm, about 10 μm to about 100 μm, or about 20 μm to about 100 μm. When the thickness d23 of the second anode active material layer is within these ranges, the cycle characteristics of the all-solid-state secondary battery are excellent. The second anode active material layer 23 may be, for example, a metal foil having a thickness within these ranges.

Regarding the all-solid-state secondary battery 1, the second anode active material layer 23 may be, for example, disposed between the anode current collector 21 and the first anode active material layer 22 before assembly of the all-solid-state secondary battery 1, or after assembling the all-solid-state secondary battery 1, the second anode active material layer 23 may be plated between the anode current collector 21 and the first anode active material layer 22 by charging.

In a case where the second anode active material layer 23 is disposed between the anode current collector layer 21 and the first anode active material layer 22 before assembly of the all-solid-state secondary battery 1, since the second anode active material layer 23 is a metal layer including lithium, the second anode active material layer 23 may act as a lithium reservoir. The cycle characteristics of the all-solid-state secondary battery 1 including the second anode active material layer 23 are further improved. For example, a lithium foil may be disposed between the anode current collector 21 and the first anode active material layer 22 before assembly of the all-solid-state secondary battery 1.

When the second anode active material layer 23 is disposed by charging after assembling the all-solid-state secondary battery 1, since the second anode active material layer 23 is not included when assembling the all-solid-state secondary battery 1, the energy density of the all-solid-state secondary battery 1 is increased. For example, when the all-solid-state secondary battery 1 is charged, the charging may be performed exceeding the charge capacity of the first anode active material layer 22. That is, the first anode active material layer 22 may be overcharged. At an initial charging stage, lithium may be absorbed into the first anode active material layer 22. That is, the anode active material included in the first anode active material layer 22 forms an alloy or a compound with lithium ions that have migrated from the cathode 10. When charging is performed to exceed the capacity of the first anode active material layer 22, for example, lithium precipitates on the rear surface of the first anode active material layer 22, that is, between the anode current collector 21 and the first anode active material layer 22, and a metal layer, which corresponds to the second anode active material layer 23, may be formed by a precipitated lithium. The second anode active material layer 23 is a metal layer comprising mainly lithium (that is, metallic lithium). This is obtained as a result of the anode active material included in the first anode active material layer 22 comprising a material that forms an alloy or compound with lithium. During discharge, lithium in the metal layers, i.e., the first anode active material layer 22 and the second anode active material layer 23, is ionized and migrates toward the cathode 10. Accordingly, lithium can be used as an anode active material in the all-solid-state secondary battery 1. In addition, since the first anode active material layer 22 covers the second anode active material layer 23, the first anode active material layer 22 acts as a protective layer for the second anode active material layer 23, that is, a metal layer, and at the same time inhibits the precipitation growth of lithium dendrite. Therefore, the short circuit and capacity reduction of the all-solid-state secondary battery 1 are suppressed, and as a result, the cycle characteristics of the all-solid-state secondary battery 1 are improved. In addition, in a case where the second anode active material layer 23 is formed by charging after all-solid-state secondary battery 1 is assembled, the anode current collector 21, the first anode active material layer 22, and a region therebetween are, for example, Li-metal-free regions that do not contain lithium (Li) metal or a Li alloy in an initial state or after discharge of the all-solid-state secondary battery.

Figure 12:
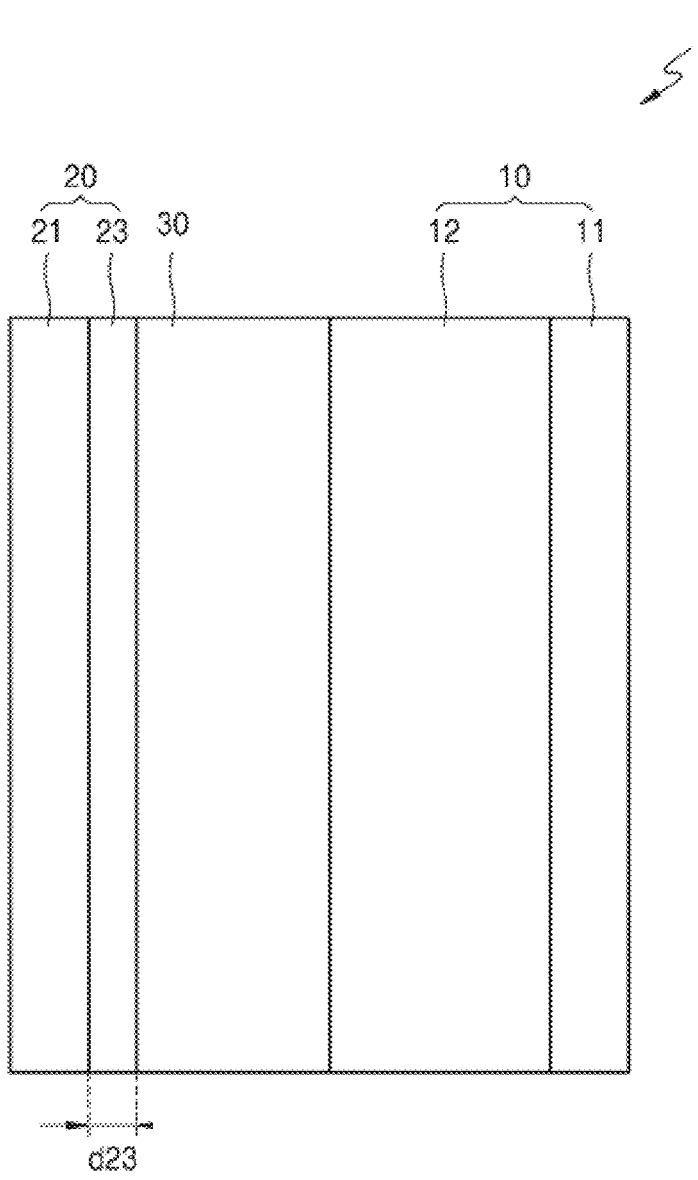

Referring to FIG. 12, the all-solid-state secondary battery 1 may have a structure in which the second anode active material layer 23 is disposed on the cathode current collector 21, and the solid electrolyte 30 is disposed directly on the second anode active material layer 23. The second anode active material layer 23 is, for example, a lithium metal layer or a lithium alloy layer.

Solid Electrolyte

Referring to FIGS. 9 to 12, the solid electrolyte 30 may contain an oxide-based solid electrolyte.

The oxide-based solid electrolyte may include, for example, $Li_{1+x+y}Al_xTi_{2-x}Si_yP_{3-y}O_{12}$ ($0<x<2$, and $0\leq y<3$), $BaTiO_3$, $Pb(Zr_pTi_{1-p})O_3$ (PZT, $0\leq p\leq1$), $Pb_{1-x}La_xZr_{1-y}Ti_yO_3$ (PLZT, $0\leq x<1$, and $0\leq y<1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ ($0<x<2$, and $0<y<3$), $Li_xAl_yTi_z(PO_4)_3$ ($0<x<2$, $0<y<1$, and $0<z<3$), $Li_{1+x+y}(Al_pGa_{1-p})_x(Ti_qGe_{1-q})_{2-x}Si_yP_{3-y}O_{12}$ ($0\leq x\leq1$, $0\leq y\leq1$, $0\leq p\leq1$, and $0\leq q\leq1$), $Li_xLa_yTiO_3$ ($0<x<2$, and $0<x<3$), $Li_2O$, $LiOH$, $Li_2CO_3$, $LiAlO_2$, $Li_2O$—$Al_2O_3$—$SiO_2$—$P_2O_5$—$TiO_2$—$GeO_2$, and $Li_{3+x}La_3M_2O_{12}$ (M=Te, Nb, or Zr, and x may be an integer from 1 to 10), or a combination thereof.

The oxide-based solid electrolyte may be, for example, a garnet-type solid of $Li_7La_3Zr_2O_{12}$ (LLZO) or $Li_{3+x}La_3Zr_{2-a}M_aO_{12}$ (M-doped LLZO, where M=Ga, W, Nb, Ta, or Al, x is an integer of 1 to 10, and $0.05\leq a\leq0.7$), or a combination thereof.

According to an embodiment, the solid electrolyte may include an LLZO solid electrolyte.

The solid electrolyte 30 may include, for example, $Li_7La_3Zr_2O_{12}$ (LLZO), $Li_{6.4}La_3Zr_{1.7}W_{0.3}O_{12}$, $Li_{6.5}La_3Zr_{1.5}Ta_{0.3}O_{12}$, $Li_7La_3Zr_{1.7}W_{0.3}O_{12}$, $Li_{4.9}La_{2.5}Ca_{0.5}Zr_{1.7}Nb_{0.3}O_{12}$, $Li_{4.9}Ga_{2.1}La_3Zr_{1.7}W_{0.3}O_{12}$, $Li_7La_3Zr_{1.5}W_{0.5}O_{12}$, $Li_7La_{2.75}Ca_{0.25}Zr_{1.75}Nb_{0.25}O_{12}$, $Li_7La_3Zr_{1.5}Nb_{0.5}O_{12}$, $Li_7La_3Zr_{1.5}Ta_{0.5}O_{12}$, $Li_{6.272}La_3Zr_{1.7}W_{0.3}O_{12}$, $Li_{5.39}Ga_{1.61}La_3Zr_{1.7}W_{0.3}O_{12}$, or a combination thereof.

Cathode

The cathode 10 includes a cathode current collector 11 and a cathode active material layer 12.

As the cathode current collector 11 may comprise, for example, a plate or foil made of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), an alloy thereof, or a combination thereof. The cathode current collector 11 may be omitted.

The cathode active material layer 12 comprises a cathode active material and a solid electrolyte. The solid electrolyte included in the cathode 10 is similar to or different from the solid electrolyte included in the solid electrolyte 30. The solid electrolyte used herein may be the same as described in connection with the solid electrolyte 30. According to an embodiment, the solid electrolyte may contain an oxide-based solid electrolyte.

The cathode 10 comprises the cathode active material according to an embodiment.

The shape of the cathode active material may be, for example, a sphere or an elliptical. A particle diameter of the cathode active material is not particularly limited, and is within a range applicable to the cathode active material of an all-solid-state secondary battery of the related art. An amount of the cathode active material of the cathode 10 is also not particularly limited, and is within a range applicable to the cathode layer of an all-solid-state secondary battery of the related art.

The cathode 10 may further include, for example, additives such as a filler, a dispersant, or an ionic conducting agent, in addition to the cathode active material and the solid electrolyte. The ionic conducting agent may be, for example, graphite, carbon black, acetylene black, ketjen black, carbon fiber, carbon tube, or metal powder. The binder may be, for example, styrene butadiene rubber (SBR), polytetrafluoroethylene, polyvinylidene fluoride, polyethylene, or a combination thereof. As a coating agent, a dispersant, or an ion-conductive auxiliary agent, may be blended in the cathode 10, and any suitable materials used in the electrodes of solid secondary batteries may be used.

The all-solid-state secondary battery is manufactured by laminating the solid electrolyte 30 on the cathode 10 and then laminating the anode 20 thereon.

According to another embodiment, the solid electrolyte 30 may be prepared by coating a composition on a substrate and drying the coated substrate to form a solid electrolyte on the substrate, and separating the solid electrolyte from the substrate, or preparing the solid electrolyte in a form of a sheet. As a non-limiting example, a polyethylene terephthalate film, or a polyethylene nonwoven fabric. may be used as the substrate.

According to another embodiment, the solid electrolyte 30 may be formed by coating a composition on the cathode 10 and drying the coated cathode, or forming the first solid electrolyte and then transferring the first solid electrolyte on to the cathode 10.

Then, the cathode, the solid electrolyte, and the anode are packaged with a packaging material, and then pressurized to manufacture an all-solid-state battery. Pressing may be performed using a roll press, a hot press, a warm isostatic press, or a combination thereof.

When the pressing is performed using roll pressing or hot pressing, the production can be made in a mass-scale, and during the compression process a suitable interface may be formed between the electrode and the solid electrolyte.

Preparation of Anode

A slurry is prepared by adding an anode active material, a conductive material, a binder, a solid electrolyte, which are materials of the first anode active material layer 22, to a polar solvent or a non-polar solvent. The prepared slurry is applied on the anode current collector 21 and the slurry is dried to prepare a first laminate. Next, the dried first laminate is pressed to prepare the anode 20. Pressing may be, for example, roll pressing, or flat pressing, but is not necessarily limited to these methods, and any pressing suitable in the art can be used herein. The pressing may be omitted.

The anode may include an anode current collector and a first anode active material layer containing an anode active material, disposed on the anode current collector, wherein the anode active material includes a carbon-based anode active material, a metal or metalloid anode active material, or a combination thereof, and the carbon-based anode active material may include an amorphous carbon, a crystalline carbon, or a combination thereof. The metal or metalloid anode active material includes gold (Au), platinum (Pt), palladium (Pd), silicon (Si), silver (Ag), aluminum (Al), bismuth (Bi), tin (Sn), zinc (Zn), or a combination thereof.

At least one second anode active material layer may be further disposed either between the anode current collector and the first anode active material layer or between the solid electrolyte and the first anode active material layer, and the second anode active material layer may be a metal layer including lithium or a lithium alloy.

Preparation of Cathode

A slurry is prepared by adding a cathode active material, a conductive material, a binder, a solid electrolyte, which are materials of the cathode active material layer 12, to a non-polar solvent. As the cathode active material, the cathode active material according to an embodiment may be used. The prepared slurry is applied on the cathode current collector 11 and the slurry is dried to prepare a first cathode laminate. The obtained laminate is pressed to manufacture the cathode 10. Pressing may be, for example, roll pressing, flat pressing, or pressurization using isostatic pressure, but is not necessarily limited to these methods, and any pressing suitable in the art can be used herein. The pressing operation may be omitted. In an embodiment, a mixture of the materials of the cathode active material layer 12 may be compressed into a form of a pellet or stretched (molded) in a form of a sheet to prepare the cathode 10. When the cathode 10 is manufactured in this way, the cathode current collector 11 may be omitted.

Manufacturing of Solid Electrolyte

The solid electrolyte 30 may be prepared by, for example, a solid electrolyte formed using an oxide-based solid electrolyte material.

Manufacturing of all-Solid-State Secondary Battery

The cathode 10, the anode 20, and the solid electrolyte 30 are laminated and pressed such that the solid electrolyte 30 is located between the cathode 10 and the anode 20, to manufacture the all-solid-state secondary battery 1.

For example, a second laminate is prepared by disposing the solid electrolyte 30 on the cathode 10. Next, the anode 20 is disposed on a second laminate such that the solid electrolyte 30 is in contact with the first anode active material layer to manufacture the all-solid-state secondary battery 1.

The structure and manufacturing method for the all-solidstate secondary battery 1 are examples only, and the constituting elements and the manufacturing procedures may be appropriately changed.

The all-solid-state secondary battery 1 may be mounted in a small intelligent transportation system (ITS) or a large electric vehicle according to the capacity and size of the battery.

The cathode active material according to an embodiment may be manufactured by a wet or a dry method.

Hereinafter, the manufacturing of the cathode active material according to an embodiment according to a dry method will be described. The cathode active material may be a compound represented by Formula 1. An example of the dry method may be, for example, a solid-phase method.

First, an indium precursor, a metal (M) precursor, a lithium precursor, a cobalt precursor, and a phosphorus precursor are mixed to obtain a precursor mixture. Here, M of the M precursor is the same as M in Formula 1.

Amounts of the indium precursor, the M precursor, the lithium precursor, the cobalt precursor, and the phosphorus precursor in the precursor mixture are stoichiometrically controlled to obtain the composite cathode active material of Formula 1.

Mixing may be, for example, mechanical milling. In the case of mechanical milling, a solvent may be added as needed. The solvent may be, for example, acetone, ethanol, water, ethylene glycol, isopropanol, or a combination thereof. An amount of the solvent may be in a range of about 50 parts by weight to about 1,000 parts by weight, for example about 100 parts by weight to about 300 parts by weight, based on 100 parts by weight of a total weight of the precursor compound. When a solvent is added, mixing of respective precursors may be made more uniformly.

Mechanical milling may be performed according to methods known in the art. Milling may use, for example, a ball mill, an air jet mill, a bead mill, a roll mill, a planetary mill, or a combination thereof.

The lithium precursor may be, for example, lithium oxide, lithium carbonate, lithium chloride, lithium sulfide, lithium nitrate ($LiNO_3$), lithium phosphate, lithium hydroxide, or a combination thereof.

The cobalt precursor may be, for example, cobalt oxide, cobalt sulfate, cobalt hydroxide, cobalt nitrate, cobalt oxalate, or a combination thereof. The indium precursor may include indium oxide, indium hydroxide, or a combination thereof.

The phosphorus precursor may be, for example, $(NH_4)_2$ $HPO_4$, $(NH_4)H_2PO_4$, $LiPO_3$, $LiH_2PO_4$, or a combination thereof.

The M precursor may be, for example, an M-element containing oxide, an M-element containing carbonate, an M-element containing chloride, an M-element containing phosphate, an M-element containing hydroxide, an M-element containing nitrate, an M-element containing hydroxide, an M-element containing oxalate, or a combination thereof.

The M precursor may be, for example, scandium oxide, scandium sulfate, scandium hydroxide, scandium nitrate, scandium oxalate, titanium oxide, titanium sulfate, titanium hydroxide, titanium nitrate, titanium oxalate, vanadium oxide, vanadium sulfate, vanadium hydroxide, vanadium nitrate, oxalic acid vanadium, copper oxide, copper sulfate, copper hydroxide, copper nitrate, copper oxalate, zinc oxide, zinc sulfate, zinc hydroxide, zinc nitrate, zinc oxalate, nickel oxide, nickel sulfate, nickel hydroxide, nickel nitrate, nickel oxalate, iron oxide, iron sulfate, iron hydroxide, iron nitrate, iron oxalate, $C_4H_4NNbO_9$ hydrate, indium nitrate, $Ti(C_4H_9O)_4$, $(NH_4)_6Mo_7O_{24}\cdot4H_2O$, $(NH_4)_6Mo_7O_{24}\cdot4H_2O$, $Ni(NO_3)_2\cdot6H_2O$, or a combination thereof.

The phosphorus (P) precursor includes, for example, $(NH_4)_2HPO_4$, $(NH_4)$, $LiPO_3$, $LiH_2PO_4$, or a combination thereof.

After performing the mixing, the resultant obtained as described above is heat treated to obtain the compound represented by Formula 1. The heat treatment may be performed at, for example, about 600° C. to about 900° C., or about 650° C. to about 850° C. The heat treatment is performed in an inert gas atmosphere or an oxidizing gas atmosphere. The inert gas atmosphere uses an inert gas such as argon or nitrogen. The oxidizing gas atmosphere uses an oxidizing gas such as air or an inert gas containing oxygen. The rate of temperature increase during the heat treatment is about 1° C./minute (min) to about 10° C./min. The heat treatment time is in a range of about 1 hour to about 48 hours, about 6 hours to about 24 hours, or about 6 hours to about 18 hours.

A drying process may optionally be performed prior to the heat treatment process. In the case of drying, the drying may be carried out at about 30° C. to about 150° C., about 50° C. to about 130° C., about 60° C. to about 120° C., or about 80° C. to about 100° C. When the drying process is performed as described above, a cathode active material having better energy density can be obtained.

Alternatively, the compound of Formula 1 may be prepared using a liquid phase method other than the solid phase method described above.

Hereinafter, it will be described in detail with reference to Examples and Comparative Examples, but is not limited to the following examples.

EXAMPLES

Manufacture of Cathode Active Material

Preparation Example 1

4 molar (M) citric acid, 2 M $Co(NO_3)_2\cdot6H_2O$, 2 M $LiNO_3$, 2 M $(NH_4)_2HPO_4$, 0.3 M $In(NO_3)_3$ hydrate, 0.3 M $C_4H_4NNbO_9$ hydrate were mixed in a liquid phase and then dried at 80° C. for 12 hours to form a gel mixture. The mixture was continuously dried at 100° C. for 30 minutes, 150° C. for 30 minutes, and 200° C. for 2 hours. The dried mixture was heat-treated in air at 800° C. for 6 hours. At this time, the rate of temperature increase was 5° C. per minute. After the heat treatment, 13 weight percent (wt %) of citric acid was mixed with the heat-treated powder for carbon coating, and heat treatment was performed thereon at 650° C. for 30 minutes in a 4% $H_2$/Ar atmosphere to obtain a cathode active material of the formula $Li_{0.8}CO_{0.9}In_{0.05}Nb_{0.05}PO_4$, as show in in Table 1.

Preparation Example 2

A cathode active material was obtained in the same manner as in Preparation Example 1, except that when preparing a mixture in a gel state, $Ti(C_4H_9O)_4$ was used instead of $C_4H_4NNbO_9$ hydrate, and the amount of each compound was stoichiometrically controlled to obtain a cathode active material having the composition shown in Table 1.

Preparation Example 3

A cathode active material was obtained in the same manner as in Preparation Example 1, except that when preparing a mixture in a gel state, $Ni(NO_3)_2\cdot6H_2O$ was used instead of $C_4H_4NNbO_9$ hydrate, and the amount of each compound was stoichiometrically controlled to obtain a cathode active material having the composition shown in Table 1.

Preparation Examples 4 and 5

Cathode active materials were obtained in the same manner as in Preparation Example 1, except that when preparing a mixture in a gel state, $(NH_4)_6Mo_7O_{24}\cdot4H_2O$ was used instead of $C_4H_4NNbO_9$ hydrate, and the amount of each compound was stoichiometrically controlled to obtain cathode active materials having the compositions shown in Table 1.

Preparation Examples 6 and 7

Cathode active materials were obtained in the same manner as in Preparation Example 1, except that when preparing a mixture in a gel state, $Ti(C_4H_9O)_4$ was used instead of $C_4H_4NNbO_9$ hydrate, and the amount of each compound was stoichiometrically controlled to obtain cathode active materials having the compositions shown in Table 1.

Preparation Example 8

A cathode active material was obtained in the same manner as in Preparation Example 1, except that when preparing a mixture in a gel state, the amount of each compound was stoichiometrically controlled to obtain a cathode active material having the composition shown in Table 1.

Comparative Preparation Example 1

A cathode active material was obtained in the same manner as in Preparation Example 1, except that 4 M citric acid, 2 M $Co(NO_3)_2 \cdot 6H_2O$, 2 M $LiNO_3$, and 2 M $(NH_4)_2HPO_4$ were used, and the amount of each compound was stoichiometrically controlled to obtain a cathode active material having the composition shown in Table 1.

Comparative Preparation Example 2

A cathode active material was obtained in the same manner as in Preparation Example 1, except that when preparing a gel mixture, 4 M citric acid, 2 M $Co(NO_3)_2 \cdot 6H_2O$, 2 M $LiNO_3$, 2 M $(NH_4)_2HPO_4$, and 0.3 M $In(NO_3)_3$ hydrate were used, and the amount of each compound was stoichiometrically controlled to obtain a cathode active material having the composition shown in Table 1.

Comparative Preparation Example 3

A cathode active material was obtained in the same manner as in Preparation Example 1, except that when preparing a gel mixture, 4 M citric acid, 2 M $Co(NO_3)_2 \cdot 6H_2O$, 2 M $LiNO_3$, 2 M $(NH_4)_2HPO_4$, and 0.25 M $(NH_4)_6Mo_7O_{24} \cdot 4H_2O$ were used, and the amount of each compound was stoichiometrically controlled to obtain a cathode active material having the composition shown in Table 1.

Comparative Preparation Example 4

A cathode active material was obtained in the same manner as in Preparation Example 1, except that when preparing a gel mixture, 4 M citric acid, 2 M $Co(NO_3)_2 \cdot 6H_2O$, 2 M $LiNO_3$, 2 M $(NH_4)_2HPO_4$, and 0.3 M $Ti(C_4H_9O)_4$ were used, and the amount of each compound was stoichiometrically controlled to obtain a cathode active material having the composition shown in Table 1.

Comparative Preparation Example 5

A cathode active material was obtained in the same manner as in Preparation Example 1, except that when preparing a gel mixture, 4 M citric acid, 2 M $Co(NO_3)_2 \cdot 6H_2O$, 2 M $LiNO_3$, 2 M $(NH_4)_2HPO_4$, and 0.3 M $Ni(NO_3)_2 \cdot 6H_2O$ were used, and the amount of each compound was stoichiometrically controlled to obtain a cathode active material having the composition shown in Table 1.

Comparative Preparation Example 6

A cathode active material was obtained in the same manner as in Preparation Example 1, except that when preparing a gel mixture, 4 M citric acid, 2 M $Co(NO_3)_2 \cdot 6H_2O$, 2 M $LiNO_3$, 2 M $(NH_4)_2HPO_4$, and 0.3 M $C_4H_4NNbO_9$ hydrate were used, and the amount of each compound was stoichiometrically controlled to obtain a cathode active material having the composition shown in Table 1.

The compositions of the cathode active materials obtained according to Preparation Examples 1 to 8 and Comparative Preparation Examples 1 to 6 are shown in Table 1.

TABLE 1

| Sample | Composition | x:y |
|---|---|---|
| Example 1 | $Li_{0.8}Co_{0.9}In_{0.05}Nb_{0.05}PO_4$ | 1:1 |
| Example 2 | $Li_{0.89}Co_{0.94}In_{0.01}Ti_{0.05}PO_4$ | 1:5 |
| Example 3 | $Li_{0.95}Co_{0.9}In_{0.05}Ni_{0.05}PO_4$ | 1:1 |
| Example 4 | $Li_{0.97}Co_{0.98}In_{0.01}Mo_{0.01}PO_4$ | 1:1 |
| Example 5 | $Li_{0.93}Co_{0.96}In_{0.01}Mo_{0.03}PO_4$ | 1:3 |
| Example 6 | $Li_{0.93}Co_{0.96}In_{0.01}Ti_{0.03}PO_4$ | 1:3 |
| Example 7 | $Li_{0.85}Co_{0.92}In_{0.01}Ti_{0.07}PO_4$ | 1:7 |
| Example 8 | $Li_{0.78}Co_{0.92}In_{0.01}Nb_{0.07}PO_4$ | 1:7 |
| Comparative Example 1 | $LiCoPO_4$ | — |
| Comparative Example 2 | $Li_{0.9}Co_{0.9}In_{0.1}PO_4$ | — |
| Comparative Example 3 | $Li_{0.8}Co_{0.9}Mo_{0.1}PO_4$ | — |
| Comparative Example 4 | $Li_{0.8}Co_{0.9}Ti_{0.1}PO_4$ | — |
| Comparative Example 5 | $Li_{1.0}Co_{0.9}Ni_{0.1}PO_4$ | — |
| Comparative Example 6 | $Li_{0.7}Co_{0.9}Nb_{0.1}PO_4$ | — |

Manufacture of Lithium Secondary Battery

Example 1

A cathode slurry was obtained by mixing the cathode active material of Preparation Example 1, carbon black (Super-P; Timcal Ltd.), which is a conductive agent, polyvinylidene fluoride (PVDF), and N-methylpyrrolidone. The weight ratio of the cathode active material, carbon black, and PVDF in the cathode slurry was 84:11:5. The cathode slurry was loaded in serval portions each having an amount of 2.8 mg/cm² on 64 printed circuit board (PCB) electrodes, and dried at 80° C. for 12 hours. A lithium metal counter electrode was used as the counter electrode of the cathode, and a solution in which 1.0M $LiPF_6$ was dissolved in a solvent in which ethylene carbonate (EC) and ethylmethyl carbonate (EMC) were mixed in a volume ratio of 3:7, was used as an electrolyte.

Examples 2 to 8

Lithium secondary batteries were manufactured in the same manner as in Example 1, except that the cathode active materials of Preparation Examples 2 to 8 were respectively used instead of the cathode active material of Preparation Example 1 when the cathode is manufactured.

Comparative Examples 1 to 6

Lithium secondary batteries were manufactured in the same manner as in Example 1, except that the cathode active materials of Comparative Preparation Example 1 and the cathode active material of Comparative Preparation Examples 2 to 6 were each used instead of the cathode active material of Preparation Example 1 when preparing the cathode.

Evaluation Example 1: X-Ray Diffraction Analysis

X-ray diffraction analysis was performed on the cathode active materials of Preparation Examples 1 to 8 and Comparative Preparation Examples 1 to 6. X-ray diffraction analysis was performed using a Panalytical Empyrean diffractometer using a Mo X-ray source.

The results of X-ray diffraction analysis for the cathode active materials of Preparation Examples 1 to 8 and the cathode active materials of Comparative Preparation Examples 1 to 4 are shown in FIG. 1.

As shown in FIG. 1, it was found that the cathode active materials obtained according to Preparation Examples 1 to 8 belong to an orthorhombic crystal system and have a crystal structure belonging to the Pnma space group. And, as shown in FIG. 1, the cathode active material of Comparative Preparation Examples 1 and the cathode active materials of Comparative Preparation Examples 2 to 6, each having a composition of $LiCoPO_4$, had crystal structures belonging to orthorhombic and Pnma space groups.

Evaluation Example 2: Battery Lifespan Characteristics

The lithium batteries prepared according to Examples 1 to 8 and Comparative Examples 1 to 6 were analyzed by cyclic voltammetry at 25° C. A scan rate of 0.2 Volts (V)/hour was cycled 10 times from 3.5 V to 5.3 V.

Figure 2:
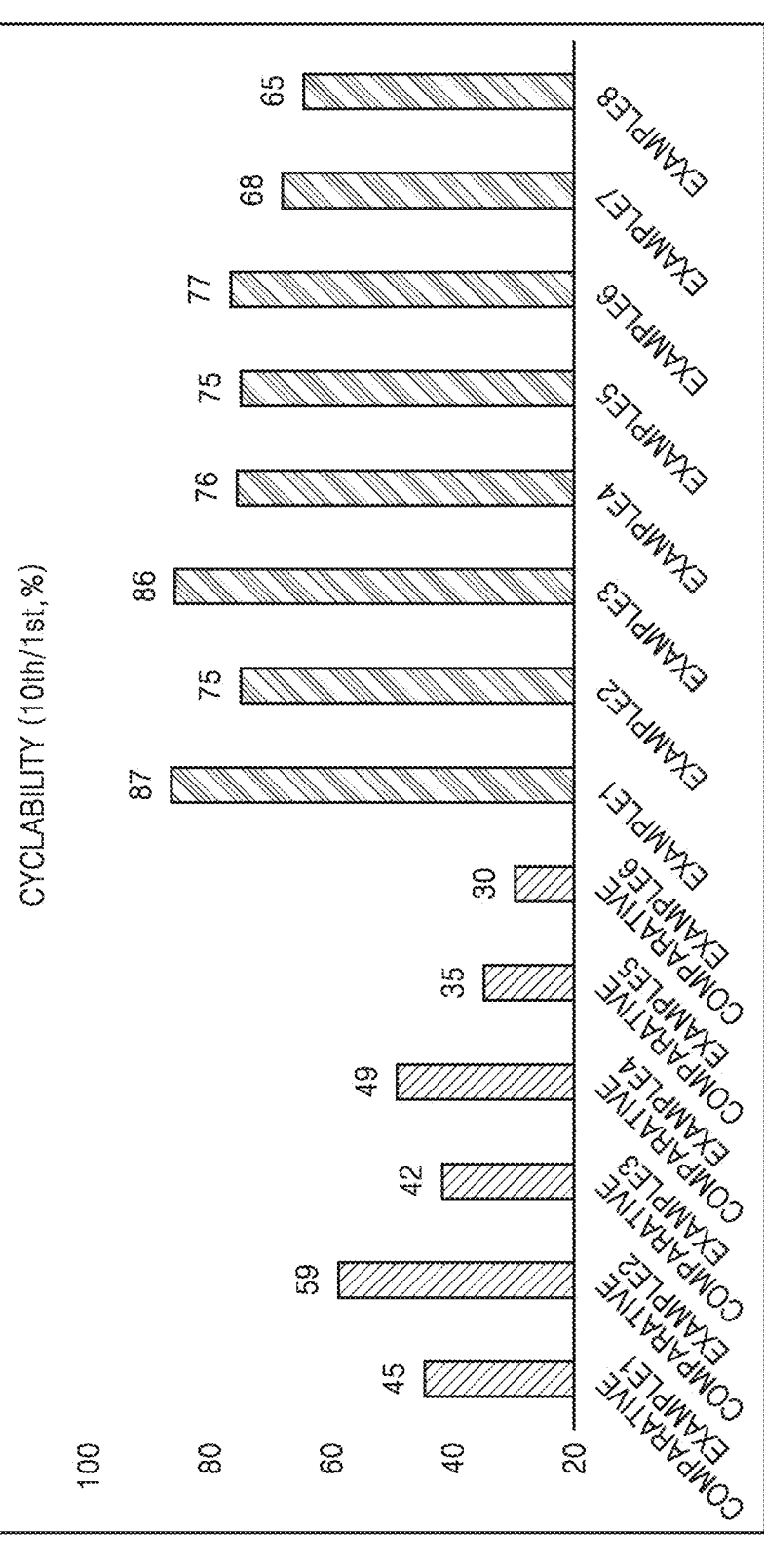
FIG. 2 is a histogram of cyclability ($10^{th}/1^{st}$, percent (%)) for the lithium secondary batteries of Examples 1 to 8 and Comparative Examples 1 to 6.

As the battery lifespan characteristics, the ratio of the discharge capacity after 10 cycles to the initial discharge capacity was measured and results thereof are shown in FIG. 2.

Referring to FIG. 2, it was found that the lithium secondary batteries of Examples 1 to 8 had improved lifespan characteristics compared to the lithium secondary batteries of Comparative Examples 1 to 6.

Evaluation Example 3: Initial Specific Capacity

Figure 3:
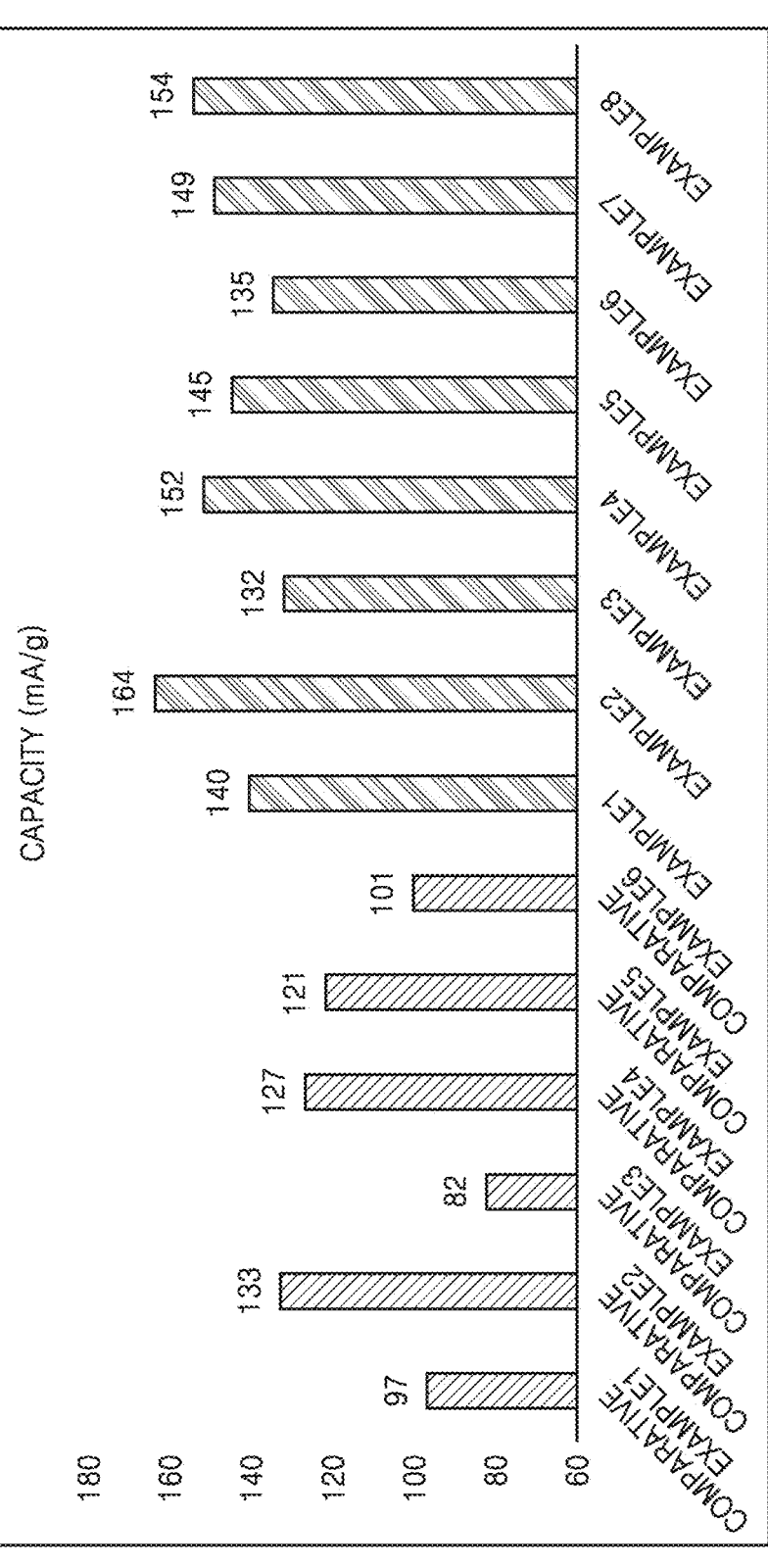
FIG. 3 is a histogram of capacity (milliampere-hours per gram, mAh/g) for the lithium secondary batteries of Examples 1 to 8 and Comparative Examples 1 to 6.
Figure 4:
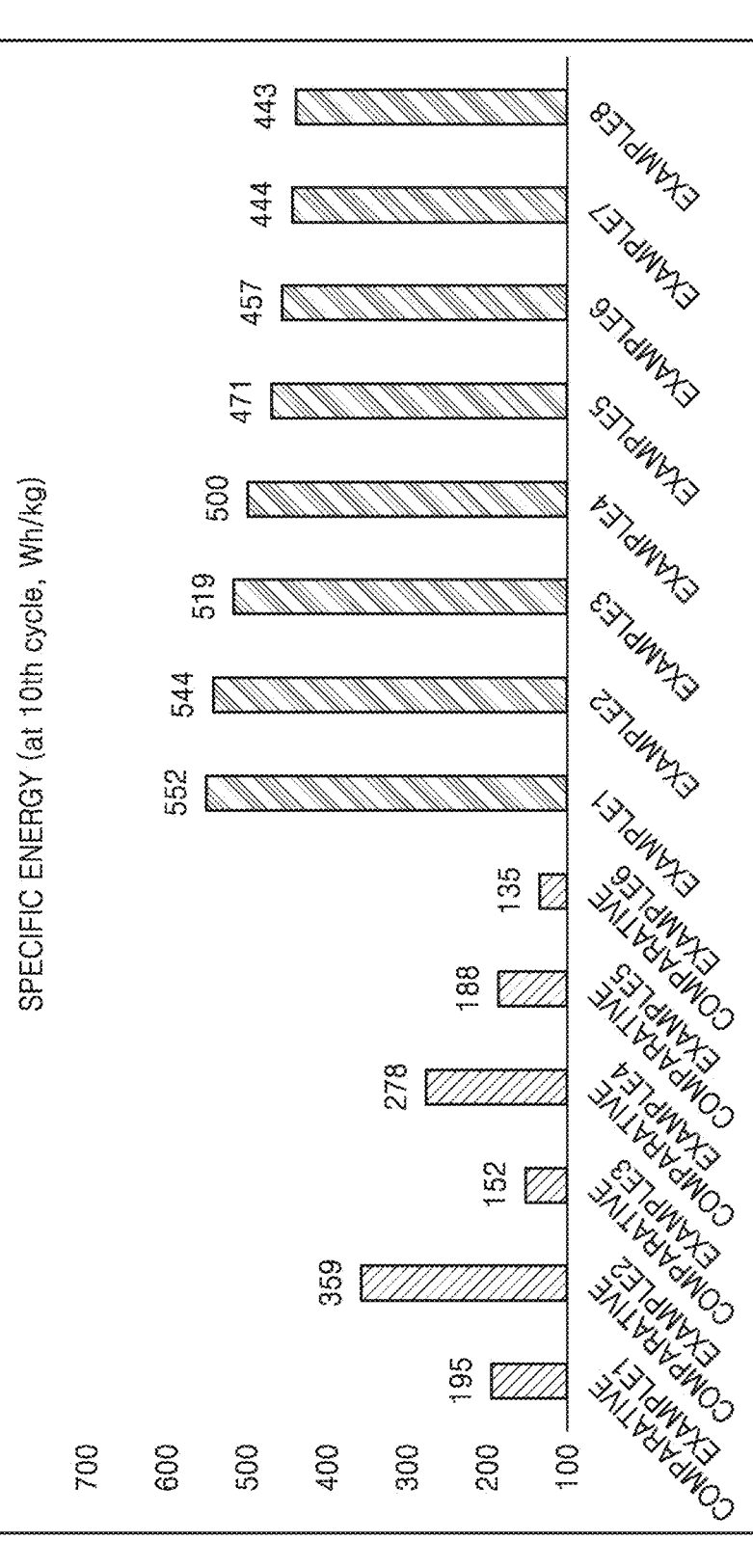
FIG. 4 is a histogram of specific energy (at 10th cycle, watt-hours per kilogram, Wh/kg) for the lithium secondary batteries of Examples 1 to 8, and Comparative Examples 1 to 6.

The initial specific capacities of the lithium secondary batteries of Examples 1 to 8 and Comparative Examples 1 to 6 were measured and the results are shown in FIG. 3. Specific capacity was measured by charging to 5.3 V at a scan rate of 0.2 V/hour at 25° C. by cyclic voltammetry, and then discharging to 3.5 V.

Referring to FIG. 3, it was found that the lithium secondary batteries of Examples 1 to 8 had improved specific capacity characteristics compared to the lithium secondary batteries of Comparative Examples 1 to 6.

Evaluation Example 4: Energy Per Weight (Specific Energy)

The specific energy of the lithium secondary batteries of Examples 1 to 8 and Comparative Examples 1 to 6 were measured. Results thereof are shown in FIG. 3. After 10 cycles of charging to 5.3V at a scan rate of 0.2V/hour and discharging to 3.5V at 25° C. by cyclic voltammetry, the specific capacity and average discharge voltage in the tenth cycle were measured.

Referring to FIG. 3, it was found that the lithium secondary batteries of Examples 1 to 8 had improved specific energy characteristics compared to the lithium secondary batteries of Comparative Examples 1 to 6.

Hereinbefore, embodiments have been described. However, the disclosure is not limited thereto. The embodiments can be variously modified and implemented within the scope of the claims, the detailed description of the disclosure, and the accompanying drawings, and would also fall within the scope of the invention.

The cathode active material according to an aspect has a high voltage characteristic and low charge/discharge overvoltage, and provides improved discharge capacity characteristics. A cathode including such a cathode active material can provide a secondary battery having improved specific energy and lifespan characteristics.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A cathode active material comprising a compound represented by Formula 1 and having an olivine structure:

$$Li_{1-\alpha}CO_{1-x-y}In_xM_yPO_4 \qquad \text{Formula 1}$$

wherein in Formula 1, $0 \leq \alpha < 1$, $0.01 \leq x \leq 0.05$, and $0.01 \leq y \leq 0.07$, and M in Formula 1 is a divalent element, a trivalent element other than In, a tetravalent element, a pentavalent element, or a combination thereof, wherein M in Formula 1 is Nb, Ni, Ti, or Mo, wherein a ratio of x to y in Formula 1 is about 1:1 to about 1:7.

2. The cathode active material of claim 1, wherein $\alpha$ in Formula 1 satisfies the condition of $0 < \alpha < 1$.

3. The cathode active material of claim 1, wherein $\alpha$ in Formula 1 is about 0.01 to about 0.3.

4. The cathode active material of claim 1, wherein the compound represented by Formula 1 comprises a compound represented by Formulae 2 to 54:

$$Li_{1-\alpha}Co_{1-x-y}In_xNb_yPO_4 \qquad \text{Formula 2}$$

wherein, in Formula 2, $0 \leq \alpha < 1$, $0.01 \leq x \leq 0.05$, and $0.01 \leq y \leq 0.071$, $$Li_{1-\alpha}Co_{1-x-y}In_xTi_yPO_4 \qquad \text{Formula 3}$$

wherein, in Formula 3, $0 \leq \alpha < 1$, $0.01 \leq x \leq 0.15$, and $0.01 \leq y \leq 0.07$, $$Li_{1-\alpha}Co_{1-x-y}In_xMo_yPO_4 \qquad \text{Formula 4}$$

wherein, in Formula 4, $0 \leq \alpha < 1$, $0.01 \leq x \leq 0.05$, and $0.01 \leq y \leq 0.07$, $$Li_{1-\alpha}Co_{1-x-y}In_xNi_yPO_4 \qquad \text{Formula 5}$$

wherein, in Formula 5, $0 \leq \alpha < 1$, $0.01 \leq x \leq 0.05$, and $0.01 \leq y \leq 0.07$ or a combination thereof.

5. The cathode active material of claim 4, wherein a ratio of x to y in Formulae 2 to 5 is about 1:1 to about 1:7.

6. The cathode active material of claim 1, wherein the cathode active material is $Li_{1-\alpha}Co_{0.9}In_{0.05}Nb_{0.05}PO_4$, $Li_{1-\alpha}Co_{0.94}In_{0.01}Ti_{0.05}PO_4$, $Li_{1-\alpha}Co_{0.9}In_{0.05}Ni_{0.05}PO_4$, $Li_{1-\alpha}Co_{0.98}In_{0.01}Mo_{0.01}PO_4$, $Li_{1-\alpha}Co_{0.96}In_{0.01}Mo_{0.03}PO_4$, $Li_{1-\alpha}Co_{0.96}In_{0.01}Ti_{0.03}PO_4$, $Li_{1-\alpha}Co_{0.92}In_{0.01}Ti_{0.07}PO_4$, $Li_{1-\alpha}Co_{0.92}In_{0.01}Nb_{0.07}PO_4$, $Li_{1-\alpha}Co_{0.94}In_{0.01}Nb_{0.05}PO_4$, $Li_{1-\alpha}Co_{0.9}In_{0.05}Ti_{0.05}PO_4$, $Li_{1-\alpha}Co_{0.94}In_{0.01}Ni_{0.05}PO_4$, $Li_{1-\alpha}Co_{0.94}In_{0.01}Mo_{0.05}PO_4$, or a combination thereof, wherein $0 \leq \alpha < 1$.

7. The cathode active material of claim 1, wherein the cathode active material is $Li_{0.8}Co_{0.9}In_{0.05}Nb_{0.05}PO_4$, $Li_{0.82}Co_{0.9}In_{0.06}Nb_{0.04}PO_4$, $Li_{0.89}Co_{0.94}In_{0.01}Ti_{0.05}PO_4$, $Li_{0.9}Co_{0.94}In_{0.02}Ti_{0.04}PO_4$, $Li_{0.95}Co_{0.9}In_{0.05}Ni_{0.05}PO_4$, $Li_{0.94}Co_{0.9}In_{0.06}Ni_{0.04}PO_4$, $Li_{0.97}Co_{0.98}In_{0.01}Mo_{0.01}PO_4$, $Li_{0.95}Co_{0.97}In_{0.01}Mo_{0.02}PO_4$, $Li_{0.93}Co_{0.96}In_{0.01}Mo_{0.03}PO_4$, $Li_{0.92}Co_{0.95}In_{0.02}Mo_{0.03}PO_4$, $Li_{0.97}Co_{0.9}In_{0.01}Ti_{0.01}PO_4$, $Li_{0.95}Co_{0.97}In_{0.01}Ti_{0.02}PO_4$, $Li_{0.93}Co_{0.96}In_{0.01}Ti_{0.03}PO_4$, $Li_{0.92}Co_{0.95}In_{0.02}Ti_{0.03}PO_4$, $Li_{0.78}Co_{0.92}In_{0.01}Nb_{0.07}PO_4$, $Li_{0.8}Co_{0.92}In_{0.02}Nb_{0.06}PO_4$, $Li_{0.84}Co_{0.94}In_{0.01}Nb_{0.05}PO_4$, $Li_{0.6}Co_{0.94}In_{0.02}Nb_{0.04}PO_4$, $Li_{0.85}Co_{0.9}In_{0.05}Ti_{0.05}PO_4$, $Li_{0.86}Co_{0.9}In_{0.06}Ti_{0.04}PO_4$, $Li_{0.99}Co_{0.94}In_{0.01}Ni_{0.05}PO_4$, $Li_{0.98}Co_{0.94}In_{0.02}Ni_{0.04}PO_4$, $Li_{0.89}Co_{0.94}In_{0.01}Mo_{0.05}PO_4$, $Li_{0.9}Co_{0.94}In_{0.02}Mo_{0.04}PO_4$, $Li_{0.85}Co_{0.92}In_{0.01}Ti_{0.07}PO_4$, or a combination thereof.

8. The cathode active material of claim 1, wherein the cathode active material has a crystal structure belonging to an orthorhombic crystal system, and the crystal structure of the cathode active material belongs to a Pnma space group.

9. The cathode active material of claim 1, wherein an average discharge voltage of the cathode active material is about 4.4 Volts or greater, and a specific capacity of the cathode active material at 25° C. is about 130 milliampere-hours per gram or greater.

10. A secondary battery comprising:

the cathode comprising the cathode active material of claim 1;

an anode; and an electrolyte between the cathode and the anode.

11. The secondary battery of claim 10, wherein the secondary battery is a lithium secondary battery or an all-solid-state battery.

12. The secondary battery of claim 11, wherein the all-solid-state battery is a multi-layer-ceramic battery or a film battery, and the multi-layer ceramic battery comprises a stack structure comprising a plurality of unit cells, each unit cell comprising:

the cathode wherein the cathode comprises a cathode active material layer comprising the cathode active material, the electrolyte wherein the electrolyte is a solid electrolyte wherein the solid electrolyte is between the cathode and the anode, and the anode wherein the anode comprises an anode active material layer, optionally wherein the cathode active material layer and an anode active material layer of an adjacent unit cell face each other.

13. The secondary battery of claim 12, wherein the secondary battery comprises:

the cathode comprising the cathode active material layer, a cathode current collector, wherein the anode active material layer comprises a first anode active material layer, a second anode active material layer, or a combination thereof, and an anode current collector, and the solid electrolyte is between the cathode and the anode, wherein the cathode active material layer is between the cathode current collector and a first surface of the solid electrolyte, and wherein the first anode active material layer, the second anode active material layer, or a combination thereof, is between the anode current collector and a second surface of the solid electrolyte.

14. The secondary battery of claim 13, wherein the secondary battery further comprises a film between the anode current collector and the first anode active material layer, or between the anode current collector and the second anode active material layer, wherein the film comprises a metal that forms an alloy with lithium, an alloy of the metal, or a combination thereof.

15. A method of preparing a cathode active material, the method comprising: mixing an indium precursor, a metal precursor, a lithium precursor, a cobalt precursor, and a phosphorus precursor to prepare a precursor mixture; and heat-treating the precursor mixture to prepare the cathode active material of claim 1, wherein a metal of the metal precursor is the divalent element, the trivalent element other than In, the tetravalent element, the pentavalent element, or a combination thereof.

16. The method of claim 15, wherein the heat-treating comprises heat-treating at about 600° C. to about 900° C. in an oxidizing atmosphere or an inert atmosphere.

17. A cathode active material comprising a compound represented by Formula 1 and having an olivine structure:

$$Li_{1-\alpha}CO_{1-x-y}In_xM_yPO_4 \qquad \text{Formula 1}$$

wherein in Formula 1, $0 \leq \alpha < 1$, $0.01 \leq x \leq 0.05$, and $0.01 \leq y \leq 0.07$, and M in Formula 1 is a divalent element, a trivalent element other than In, a tetravalent element, a pentavalent element, or a combination thereof, wherein M in Formula 1 comprises Mo.

* * * * *